United States Patent
Yang et al.

(10) Patent No.: US 12,120,060 B2
(45) Date of Patent: Oct. 15, 2024

(54) ACKNOWLEDGEMENT CODEBOOK DESIGN FOR MULTIPLE TRANSMISSION RECEPTION POINTS

(71) Applicant: QUALCOMM incorporated, San Diego, CA (US)

(72) Inventors: Wei Yang, San Diego, CA (US); Yi Huang, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 16/573,832

(22) Filed: Sep. 17, 2019

(65) Prior Publication Data

US 2020/0092068 A1 Mar. 19, 2020

Related U.S. Application Data

(60) Provisional application No. 62/733,519, filed on Sep. 19, 2018.

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1819* (2013.01); *H04L 1/1896* (2013.01);
(Continued)

(58) Field of Classification Search
CPC ... H04L 1/1664; H04L 1/1671; H04L 1/1819; H04L 1/1854; H04L 1/1858;
(Continued)

(56) References Cited

U.S. PATENT DOCUMENTS

| | | | |
|---|---|---|---|
| 6,504,837 B1 * | 1/2003 | Menzel | H04B 7/022 370/347 |
| 8,699,411 B1 * | 4/2014 | Gossett | H04W 72/52 370/339 |

(Continued)

FOREIGN PATENT DOCUMENTS

| | | |
|---|---|---|
| CN | 108093487 A | 5/2018 |
| WO | 2016123045 | 8/2016 |

(Continued)

OTHER PUBLICATIONS

R1-1716546—Discussion on Multi-TRP DL Transmission (Year: 2017).*

(Continued)

*Primary Examiner* — Dung B Huynh
(74) *Attorney, Agent, or Firm* — Holland & Hart LLP

(57) ABSTRACT

Methods, systems, and devices for wireless communications are described. A user equipment (UE) may receive a slot allocation to provide hybrid automatic repeat request (HARQ) acknowledgement (ACK) feedback to multiple transmission reception points (TRPs). For example, each TRP may be allocated at least one slot for HARQ-ACK feedback such that HARQ-ACK feedback for different TRPs may not be transmitted in a same slot. Additionally, the UE may determine a TRP-specific HARQ-ACK codebook for feedback transmissions to each TRP in their corresponding slots. In some cases, the UE may also determine TRP-specific uplink parameters for the feedback transmissions to each TRP. The UE may then transmit feedback to a TRP using a corresponding slot from the slot allocation and using the TRP-specific HARQ-ACK codebook and the TRP-specific uplink parameters.

48 Claims, 20 Drawing Sheets

(51) Int. Cl.
*H04L 1/1867* (2023.01)
*H04W 52/10* (2009.01)
*H04W 72/0446* (2023.01)
*H04W 72/23* (2023.01)

(52) U.S. Cl.
CPC ....... *H04W 52/10* (2013.01); *H04W 72/0446* (2013.01); *H04W 72/23* (2023.01)

(58) Field of Classification Search
CPC ... H04L 5/0044; H04L 5/0055; H04L 5/0094; H04L 1/16–1896; H04W 52/06; H04W 52/08; H04W 52/10; H04W 72/042; H04W 72/0446
See application file for complete search history.

(56) References Cited

U.S. PATENT DOCUMENTS

| | | | | |
|---|---|---|---|---|
| 9,294,229 | B2* | 3/2016 | Yang | H04L 5/0053 |
| 9,301,183 | B2* | 3/2016 | Heo | H04L 65/65 |
| 10,205,577 | B2* | 2/2019 | Kim | H04L 1/0027 |
| 10,270,579 | B2 | 4/2019 | Chendamarai et al. | |
| 10,892,855 | B2* | 1/2021 | Uchino | H04L 1/1822 |
| 10,999,007 | B2* | 5/2021 | Gupta | H04W 28/04 |
| 11,108,504 | B2* | 8/2021 | Takeda | H04L 1/1864 |
| 11,128,407 | B2* | 9/2021 | Papasakellariou | H04L 1/1861 |
| 11,290,153 | B2* | 3/2022 | Xiao | H04L 5/0053 |
| 11,432,191 | B2* | 8/2022 | Chen | H04L 1/1861 |
| 11,539,404 | B2* | 12/2022 | Lange | H04W 52/42 |
| 11,611,412 | B2* | 3/2023 | Takeda | H04L 1/1896 |
| 2004/0100918 | A1* | 5/2004 | Toskala | H04W 36/18 370/337 |
| 2006/0171295 | A1* | 8/2006 | Ihm | H04L 5/0094 370/328 |
| 2006/0286996 | A1* | 12/2006 | Julian | H04W 52/146 455/522 |
| 2007/0285312 | A1* | 12/2007 | Gao | H01Q 3/40 342/367 |
| 2009/0046652 | A1* | 2/2009 | Shitara | H04B 7/2615 375/267 |
| 2009/0245212 | A1* | 10/2009 | Sambhwani | H04L 1/1671 370/336 |
| 2010/0157917 | A1* | 6/2010 | Jeong | H04L 5/005 370/329 |
| 2010/0322331 | A1* | 12/2010 | Sun | H04B 7/0626 375/260 |
| 2011/0097994 | A1* | 4/2011 | Onodera | H04L 5/0091 455/7 |
| 2011/0201341 | A1* | 8/2011 | Choudhury | H04W 72/27 455/450 |
| 2012/0027113 | A1* | 2/2012 | Gaal | H04B 7/0417 375/267 |
| 2012/0044890 | A1* | 2/2012 | Jen | H04L 5/0053 370/329 |
| 2012/0120927 | A1* | 5/2012 | Bucknell | H04L 1/1829 370/336 |
| 2012/0127949 | A1* | 5/2012 | Yoshimoto | H04L 1/0077 370/328 |
| 2012/0157072 | A1* | 6/2012 | Yu | H04W 76/15 455/418 |
| 2012/0188976 | A1* | 7/2012 | Kim | H04L 1/1887 370/329 |
| 2012/0195292 | A1* | 8/2012 | Ko | H04L 1/1893 370/336 |
| 2012/0230272 | A1* | 9/2012 | Kim | H04W 72/0453 370/329 |
| 2012/0269140 | A1* | 10/2012 | Nam | H04B 7/024 370/329 |
| 2012/0320782 | A1* | 12/2012 | Seo | H04W 72/042 370/252 |
| 2012/0320847 | A1* | 12/2012 | Nam | H04L 1/1893 370/329 |
| 2013/0039163 | A1* | 2/2013 | Heo | H04L 5/0055 370/208 |
| 2013/0242816 | A1* | 9/2013 | He | H04W 52/243 370/280 |
| 2013/0244640 | A1* | 9/2013 | Viorel | H04W 56/0045 455/422.1 |
| 2013/0258974 | A1* | 10/2013 | Lee | H04W 24/10 370/329 |
| 2013/0308569 | A1* | 11/2013 | Jeong | H04B 7/024 370/329 |
| 2013/0322280 | A1* | 12/2013 | Pi | H04W 56/0005 370/252 |
| 2013/0324109 | A1* | 12/2013 | Kim | H04L 1/0028 455/422.1 |
| 2014/0018090 | A1* | 1/2014 | Khoryaev | H04L 5/0037 455/452.1 |
| 2014/0064415 | A1* | 3/2014 | Hultell | H04L 1/0043 375/340 |
| 2014/0098780 | A1* | 4/2014 | Kim | H04W 72/0413 370/329 |
| 2014/0126512 | A1* | 5/2014 | Kim | H04L 5/0073 370/329 |
| 2014/0177531 | A1* | 6/2014 | Imamura | H04L 5/0048 370/328 |
| 2014/0269454 | A1* | 9/2014 | Papasakellariou | H04W 52/146 370/280 |
| 2014/0293943 | A1* | 10/2014 | Yoon | H04L 27/2613 370/329 |
| 2014/0314031 | A1* | 10/2014 | Kim | H04W 72/0406 370/329 |
| 2014/0328277 | A1* | 11/2014 | Xiao | H04B 7/024 370/328 |
| 2015/0003351 | A1* | 1/2015 | Park | H04J 1/02 370/329 |
| 2015/0009931 | A1* | 1/2015 | Yamazaki | H04L 1/0077 370/329 |
| 2015/0023264 | A1* | 1/2015 | Tiirola | H04W 72/042 370/329 |
| 2015/0023275 | A1* | 1/2015 | Kim | H04W 56/0045 370/329 |
| 2015/0049704 | A1* | 2/2015 | Park | H04L 5/0051 370/329 |
| 2015/0055517 | A1* | 2/2015 | Samdanis | H04W 36/0055 370/280 |
| 2015/0071194 | A1* | 3/2015 | Kim | H04W 72/0446 370/329 |
| 2015/0098367 | A1* | 4/2015 | Park | H04L 5/0055 370/278 |
| 2015/0110027 | A1* | 4/2015 | Lim | H04L 1/1864 370/329 |
| 2015/0124673 | A1* | 5/2015 | Ouchi | H04W 52/58 370/311 |
| 2015/0156768 | A1* | 6/2015 | Guan | H04L 1/1607 370/329 |
| 2015/0181590 | A1* | 6/2015 | Park | H04L 5/0055 370/280 |
| 2015/0208435 | A1* | 7/2015 | Zhu | H04W 72/1268 370/280 |
| 2015/0215930 | A1* | 7/2015 | Kim | H04L 5/0055 370/329 |
| 2015/0237610 | A1* | 8/2015 | Zhang | H04L 1/1812 370/280 |
| 2015/0245339 | A1* | 8/2015 | Verma | H04W 52/14 370/330 |
| 2016/0014628 | A1* | 1/2016 | Kim | H04W 48/04 370/329 |
| 2016/0020875 | A1 | 1/2016 | Seo et al. | |
| 2016/0050054 | A1* | 2/2016 | Wager | H04W 72/21 455/450 |
| 2016/0081077 | A1* | 3/2016 | Li | H04W 72/23 370/280 |
| 2016/0105905 | A1* | 4/2016 | Vajapeyam | H04B 7/0626 370/330 |
| 2016/0127102 | A1* | 5/2016 | Kim | H04L 5/0026 370/330 |

(56) References Cited

U.S. PATENT DOCUMENTS

| | | | |
|---|---|---|---|
| 2016/0165626 A1* | 6/2016 | Finne | H04W 72/1268 370/336 |
| 2016/0173265 A1* | 6/2016 | Dadoun | H04B 3/02 370/294 |
| 2016/0219560 A1 | 7/2016 | Chen et al. | |
| 2016/0219578 A1* | 7/2016 | Lim | H04B 7/026 |
| 2016/0219595 A1* | 7/2016 | Larsson | H04L 5/001 |
| 2016/0227559 A1* | 8/2016 | Schober | H04J 11/004 |
| 2016/0295522 A1* | 10/2016 | Qin | H04W 52/28 |
| 2017/0078065 A1* | 3/2017 | Nam | H04L 5/0078 |
| 2017/0150503 A1* | 5/2017 | Fukuta | H04L 5/0048 |
| 2017/0215172 A1* | 7/2017 | Yang | H04B 7/26 |
| 2017/0230086 A1* | 8/2017 | Chen | H04L 1/1845 |
| 2017/0273056 A1* | 9/2017 | Papasakellariou | H04W 52/325 |
| 2017/0273070 A1* | 9/2017 | Yi | H04L 5/0055 |
| 2017/0353223 A1 | 12/2017 | Kim et al. | |
| 2018/0019843 A1* | 1/2018 | Papasakellariou | H04L 1/1861 |
| 2018/0020434 A1* | 1/2018 | Shao | H04W 72/20 |
| 2018/0020454 A1* | 1/2018 | Lim | H04L 1/0039 |
| 2018/0063792 A1* | 3/2018 | Sirotkin | H04W 4/029 |
| 2018/0115907 A1* | 4/2018 | Damnjanovic | H04W 72/1215 |
| 2018/0123765 A1* | 5/2018 | Cao | H04L 1/1893 |
| 2018/0124815 A1* | 5/2018 | Papasakellariou | H04L 1/1861 |
| 2018/0132264 A1* | 5/2018 | Jung | H04L 1/1854 |
| 2018/0139014 A1* | 5/2018 | Xiong | H04L 1/18 |
| 2018/0139657 A1* | 5/2018 | Damnjanovic | H04L 1/0079 |
| 2018/0199343 A1* | 7/2018 | Deogun | H04L 5/0044 |
| 2018/0212742 A1* | 7/2018 | Takeda | H04L 5/0098 |
| 2018/0220411 A1* | 8/2018 | Si | H04W 72/1268 |
| 2018/0227859 A1* | 8/2018 | Zhang | H04W 52/30 |
| 2018/0241510 A1* | 8/2018 | Shen | H04L 1/1812 |
| 2018/0254872 A1* | 9/2018 | Seo | H04L 5/0055 |
| 2018/0262316 A1* | 9/2018 | Wang | H04L 5/0053 |
| 2018/0270799 A1* | 9/2018 | Noh | H04L 1/1812 |
| 2018/0310257 A1* | 10/2018 | Papasakellariou | H04W 52/367 |
| 2018/0324730 A1* | 11/2018 | Lee | H04J 11/0069 |
| 2018/0324841 A1* | 11/2018 | Horiuchi | H04W 72/04 |
| 2018/0343097 A1* | 11/2018 | Takeda | H04L 5/0055 |
| 2019/0037622 A1* | 1/2019 | Blasco Serrano | H04W 72/042 |
| 2019/0103951 A1* | 4/2019 | Park | H04W 72/042 |
| 2019/0124654 A1* | 4/2019 | Ch | H04W 72/0446 |
| 2019/0173622 A1* | 6/2019 | Xiong | H04L 1/1819 |
| 2019/0215783 A1* | 7/2019 | Chakraborty | H04W 52/367 |
| 2019/0246416 A1* | 8/2019 | Park | H04L 1/1812 |
| 2019/0254007 A1* | 8/2019 | Gupta | H04L 5/0055 |
| 2019/0261278 A1* | 8/2019 | Gupta | H04L 5/0035 |
| 2019/0261451 A1* | 8/2019 | Zhang | H04L 5/0092 |
| 2019/0274159 A1* | 9/2019 | Lunttila | H04L 5/0053 |
| 2019/0297603 A1* | 9/2019 | Guo | H04W 72/046 |
| 2019/0306922 A1* | 10/2019 | Xiong | H04W 72/21 |
| 2019/0313423 A1* | 10/2019 | Gupta | H04B 17/309 |
| 2019/0327744 A1* | 10/2019 | Sun | H04W 72/0453 |
| 2019/0342035 A1* | 11/2019 | Zhang | H04L 1/0073 |
| 2019/0342040 A1* | 11/2019 | Tiirola | H04W 72/1242 |
| 2019/0342058 A1* | 11/2019 | Kwak | H04L 5/0044 |
| 2019/0342865 A1* | 11/2019 | Shin | H04W 72/042 |
| 2019/0363840 A1* | 11/2019 | Wang | H04L 5/0055 |
| 2019/0387479 A1* | 12/2019 | Gong | H04W 72/1268 |
| 2020/0007282 A1* | 1/2020 | Yoon | H04W 36/00692 |
| 2020/0015250 A1* | 1/2020 | Yang | H04W 76/11 |
| 2020/0021402 A1* | 1/2020 | Xu | H04L 1/1887 |
| 2020/0022119 A1* | 1/2020 | Wang | H04W 72/12 |
| 2020/0036480 A1* | 1/2020 | Yang | H04B 7/024 |
| 2020/0036489 A1* | 1/2020 | Wang | H04L 5/0035 |
| 2020/0037254 A1* | 1/2020 | Comsa | H04W 52/281 |
| 2020/0037305 A1* | 1/2020 | Yang | H04W 72/23 |
| 2020/0052831 A1* | 2/2020 | Yang | H04L 1/1614 |
| 2020/0059277 A1* | 2/2020 | Su | H04L 5/0023 |
| 2020/0059390 A1* | 2/2020 | Zhang | H04L 1/0009 |
| 2020/0059908 A1* | 2/2020 | Joseph | H04W 76/11 |
| 2020/0092068 A1* | 3/2020 | Yang | H04L 1/1858 |
| 2020/0112403 A1* | 4/2020 | Liu | H04L 1/1812 |
| 2020/0112416 A1* | 4/2020 | Oh | H04L 1/1896 |
| 2020/0119899 A1* | 4/2020 | Qin | H04L 5/10 |
| 2020/0136784 A1* | 4/2020 | Yi | H04L 1/1812 |
| 2020/0196343 A1* | 6/2020 | Marinier | H04L 1/1896 |
| 2020/0221444 A1* | 7/2020 | Tiirola | H04W 72/0413 |
| 2020/0221456 A1* | 7/2020 | Kwak | H04W 72/0446 |
| 2020/0280425 A1* | 9/2020 | Wu | H04L 5/0078 |
| 2020/0287678 A1* | 9/2020 | Li | H04L 27/2613 |
| 2020/0358487 A1* | 11/2020 | Yang | H04L 1/1819 |
| 2020/0366417 A1* | 11/2020 | Lei | H04L 1/1685 |
| 2020/0374044 A1* | 11/2020 | Lei | H04W 72/23 |
| 2020/0383089 A1* | 12/2020 | Goto | H04W 72/04 |
| 2020/0396039 A1* | 12/2020 | Baldemair | H04L 5/0055 |
| 2021/0050955 A1* | 2/2021 | Park | H04L 1/1614 |
| 2021/0099210 A1* | 4/2021 | Ramireddy | H04L 25/0224 |
| 2021/0112547 A1* | 4/2021 | Yasukawa | H04W 72/20 |
| 2021/0112594 A1* | 4/2021 | Shimomura | H04W 74/08 |
| 2021/0135823 A1* | 5/2021 | Zhang | H04B 7/0604 |
| 2021/0143934 A1* | 5/2021 | Golitschek Edler Von Elbwart | H04B 7/0626 |
| 2021/0153185 A1* | 5/2021 | Schober | H04L 1/1621 |
| 2021/0203451 A1* | 7/2021 | Lei | H04L 1/1854 |
| 2021/0226740 A1* | 7/2021 | Lei | H04L 1/1864 |
| 2021/0226759 A1* | 7/2021 | Takeda | H04L 1/1858 |
| 2021/0235482 A1* | 7/2021 | Yoshioka | H04W 72/0413 |
| 2021/0266893 A1* | 8/2021 | Lee | H04L 1/1864 |
| 2021/0273752 A1* | 9/2021 | Takeda | H04L 1/1896 |
| 2021/0297185 A1* | 9/2021 | Amuru | H04L 27/26025 |
| 2021/0297199 A1* | 9/2021 | Miao | H04L 1/1896 |
| 2021/0314985 A1* | 10/2021 | Yang | H04L 5/0082 |
| 2021/0328728 A1* | 10/2021 | El Hamss | H04L 5/0091 |
| 2021/0329623 A1* | 10/2021 | Yoshioka | H04L 5/0044 |
| 2021/0329676 A1* | 10/2021 | Yang | H04W 74/0808 |
| 2021/0329682 A1* | 10/2021 | Takeda | H04L 1/1864 |
| 2021/0367644 A1* | 11/2021 | Xu | H04B 7/043 |
| 2021/0368503 A1* | 11/2021 | Jung | H04L 1/1896 |
| 2022/0103330 A1* | 3/2022 | Li | H04L 1/1812 |
| 2022/0131653 A1* | 4/2022 | Ma | H04L 1/1864 |
| 2022/0159691 A1* | 5/2022 | Chen | H04W 76/20 |
| 2022/0167392 A1* | 5/2022 | Tian | H04B 7/0456 |
| 2022/0294591 A1* | 9/2022 | Liu | H04L 1/1864 |
| 2022/0360950 A1* | 11/2022 | Li | H04L 1/1812 |
| 2022/0393805 A1* | 12/2022 | Guo | H04L 1/1812 |
| 2022/0393822 A1* | 12/2022 | Xu | H04L 27/2675 |
| 2023/0043604 A1* | 2/2023 | Lee | H04W 72/0446 |
| 2023/0137109 A1* | 5/2023 | Sun | H04W 76/15 370/329 |
| 2023/0396531 A1* | 12/2023 | Luo | H04W 52/386 |

FOREIGN PATENT DOCUMENTS

| | | |
|---|---|---|
| WO | WO-2016126653 A1 | 8/2016 |
| WO | WO-2018063200 A1 | 4/2018 |

OTHER PUBLICATIONS

Ericsson: "On Remaining Issues on Carrier Aggregation", 3GPP Draft, 3GPP TSG RAN WG1 Meeting #92, R1-1802917 On Remaining Issues on Carrier Aggregation, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), 16 Pages, XP051398306, Retrieved from the Internet: URL: http://www.3gpp.org/ftp/tsg_ran/WG1_RL1/TSGR1_92/Docs/ [retrieved on Feb. 17, 2018].

International Search Report and Written Opinion—PCT/US2019/051696—ISA/EPO—dated Jan. 2, 2020.

Samsung: "Second Offline Summary on CA Aspects", 3GPP Draft; R1-1803409 CA and UCI Offline 2, 3rd Generation Partnership Project (3GPP), Mobile Competence Centre, 650, Route Des Lucioles; F-06921 Sophia-Antipolis Cedex, France, vol. RAN WG1, No.

(56) References Cited

OTHER PUBLICATIONS

Athens, Greece; Feb. 26, 2018-Mar. 2, 2018, Mar. 1, 2018 (Mar. 1, 2018), 9 Pages, XP051398632, Retrieved from the Internet: URL: http://www.3gpp.org/ftp/tsg ran/WG1_RL1/TSGR1_92/Docs/ [retrieved on Mar. 1, 2018].
Taiwan Search Report—TW108133790—TIPO—dated Sep. 28, 2022.

* cited by examiner

ACKNOWLEDGEMENT CODEBOOK DESIGN FOR MULTIPLE TRANSMISSION RECEPTION POINTS

CROSS REFERENCE

The present application for patent claims the benefit of U.S. Provisional Patent Application No. 62/733,519 by YANG et al., entitled "ACKNOWLEDGEMENT CODEBOOK DESIGN FOR MULTIPLE TRANSMISSION RECEPTION POINTS," filed Sep. 19, 2018, assigned to the assignee hereof, and expressly incorporated herein.

BACKGROUND

The following relates generally to wireless communications, and more specifically to acknowledgement (ACK) codebook design for multiple transmission reception points (TRPs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may communicate with multiple base stations and/or multiple cells on one or more base stations simultaneously. Each base station or cell on a base station may be referred to as a TRP. In some cases, the TRPs may coordinate semi-statically for different downlink and uplink transmission configurations due to a non-ideal backhaul connection between the TRPs. Accordingly, because of the non-ideal backhaul connection, each TRP may transmit separate downlink channel messages to the UE, and the UE may receive the separate downlink channel messages at approximately the same time. The UE may then be expected to transmit ACK feedback for each downlink channel message received. However, the UE may be unable to transmit multiple uplink messages at the same time (e.g., simultaneously). As such, efficient techniques are desired for transmitting ACK feedback to a TRP for a received downlink channel message.

SUMMARY

The described techniques relate to improved methods, systems, devices, and apparatuses that support an acknowledgement (ACK) codebook design for multiple transmission reception points (TRPs). Generally, the described techniques provide for a user equipment (UE) receiving a slot allocation to provide hybrid automatic repeat request (HARQ) ACK feedback to multiple TRPs. For example, each TRP may be allocated at least one slot for HARQ-ACK feedback such that HARQ-ACK feedback for different TRPs may not be transmitted in a same slot. Additionally, the UE may determine a TRP-specific HARQ-ACK codebook for feedback transmissions to each TRP in their corresponding slots, where the TRP-specific HARQ-ACK codebook is determined based on a downlink control information (DCI) message and/or TRP-specific parameters. In some cases, the UE may also determine TRP-specific uplink parameters for the feedback transmissions to each TRP, where the TRP-specific uplink parameters may include quasi co-location (QCL) information, power control parameters, and timing advance (TA) parameters specific to each TRP. The UE may then transmit feedback to a TRP using a corresponding slot from the slot allocation and using the TRP-specific HARQ-ACK codebook and the TRP-specific uplink parameters. Additionally, if multiple downlink channel transmissions have a same ending orthogonal frequency-division multiplexing (OFDM) symbol, the UE may not be expected to receive more than one downlink channel transmission in a same slot from a same TRP or provide HARQ-ACK feedback for more than one downlink channel transmission in the same slot in a same HARQ-ACK feedback transmission.

A method of wireless communication at a UE is described. The method may include receiving a slot allocation for the UE to provide HARQ-ACK feedback to a set of TRPs, determining a TRP-specific HARQ-ACK codebook for feedback transmissions to a TRP of the set of TRPs based on the slot allocation, determining one or more TRP-specific uplink parameters for feedback transmissions to the TRP, and transmitting feedback to the TRP using a corresponding slot identified by the slot allocation and using the TRP-specific HARQ-ACK codebook and the one or more TRP-specific uplink parameters.

An apparatus for wireless communication at a UE is described. The apparatus may include a processor, memory coupled with the processor, and instructions stored in the memory. The instructions may be executable by the processor to cause the apparatus to receive a slot allocation for the UE to provide HARQ-ACK feedback to a set of TRPs, determine a TRP-specific HARQ-ACK codebook for feedback transmissions to a TRP of the set of TRPs based on the slot allocation, determine one or more TRP-specific uplink parameters for feedback transmissions to the TRP, and transmit feedback to the TRP using a corresponding slot identified by the slot allocation and using the TRP-specific HARQ-ACK codebook and the one or more TRP-specific uplink parameters.

Another apparatus for wireless communication at a UE is described. The apparatus may include means for receiving a slot allocation for the UE to provide HARQ-ACK feedback to a set of TRPs, determining a TRP-specific HARQ-ACK codebook for feedback transmissions to a TRP of the set of TRPs based on the slot allocation, determining one or more TRP-specific uplink parameters for feedback transmissions to the TRP, and transmitting feedback to the TRP using a corresponding slot identified by the slot allocation and using the TRP-specific HARQ-ACK codebook and the one or more TRP-specific uplink parameters.

A non-transitory computer-readable medium storing code for wireless communication at a UE is described. The code may include instructions executable by a processor to receive a slot allocation for the UE to provide HARQ-ACK feedback to a set of TRPs, determine a TRP-specific HARQ-ACK codebook for feedback transmissions to a TRP of the set of TRPs based on the slot allocation, determine one or more TRP-specific uplink parameters for feedback transmissions to the TRP, and transmit feedback to the TRP using a corresponding slot identified by the slot allocation and using the TRP-specific HARQ-ACK codebook and the one or more TRP-specific uplink parameters.

In some examples of the method, apparatuses, and non-transitory computer-readable medium described herein, receiving the slot allocation may include operations, features, means, or instructions for receiving an allocation of slots to be used by the UE for providing HARQ-ACK feedback to different TRPs of the set of TRPs, where each slot identified in the slot allocation may be allocated for feedback transmissions by the UE to only one TRP of the set of TRPs.

In some examples of the method, apparatuses, and non-transitory computer-readable medium described herein, receiving the slot allocation may include operations, features, means, or instructions for receiving an allocation of slots to be used by the UE for providing HARQ-ACK feedback to different TRPs of the set of TRPs, where the slots may be allocated asymmetrically between the set of TRPs.

In some examples of the method, apparatuses, and non-transitory computer-readable medium described herein, determining the TRP-specific HARQ-ACK codebook may include operations, features, means, or instructions for receiving a DCI message that includes an indication of a size of the HARQ-ACK codebook.

In some examples of the method, apparatuses, and non-transitory computer-readable medium described herein, determining the TRP-specific HARQ-ACK codebook may include operations, features, means, or instructions for determining the TRP-specific HARQ-ACK codebook based on at least one TRP-specific parameter that may be semi-statically received.

In some examples of the method, apparatuses, and non-transitory computer-readable medium described herein, the at least one TRP-specific parameter may be one or more of a number of cells supported by the TRP for carrier aggregation (CA), a cell-specific uplink-downlink configuration associated with a cell of the TRP, a per-bandwidth part (BWP) table of time-domain resource allocation for physical downlink shared channels (PDSCHs) for the TRP, a per-BWP set of parameters defining PDSCH-to-feedback timing for the TRP, or a per-BWP PDSCH repetition factor for the TRP.

Some examples of the method, apparatuses, and non-transitory computer-readable medium described herein may further include operations, features, means, or instructions for identifying only one PDSCH reception opportunity per slot per cell from the TRP for time-domain resource allocations that overlap in time and receiving one PDSCH transmission from the TRP associated with the identified PDSCH reception opportunity, where the feedback to be transmitted in the corresponding slot includes feedback information pertaining to the one PDSCH reception or the PDSCH transmission.

Some examples of the method, apparatuses, and non-transitory computer-readable medium described herein may further include operations, features, means, or instructions for receiving, from an additional TRP of the set of TRPs, an additional PDSCH, the additional PDSCH having a time-domain resource allocation in a same component carrier (CC) that overlaps with the PDSCH received from the TRP and transmitting the HARQ-ACK feedback to the additional TRP in a slot allocated for the additional TRP.

In some examples of the method, apparatuses, and non-transitory computer-readable medium described herein, determining the TRP-specific HARQ-ACK codebook may include operations, features, means, or instructions for comparing the slot allocation with a cell-specific uplink-downlink configuration associated with a cell of the TRP, where the feedback may be transmitted to the TRP using the corresponding slot only if the corresponding slot may be identified as an uplink slot by the cell-specific uplink-downlink configuration.

In some examples of the method, apparatuses, and non-transitory computer-readable medium described herein, determining the TRP-specific HARQ-ACK codebook may include operations, features, means, or instructions for comparing the slot allocation with a cell-specific uplink-downlink configuration associated with a cell of the TRP, where the feedback may be transmitted to the TRP using the corresponding slot only if symbols of the corresponding slot allocated for feedback transmission may be also allocated for uplink transmissions by the cell-specific uplink-downlink configuration.

Some examples of the method, apparatuses, and non-transitory computer-readable medium described herein may further include operations, features, means, or instructions for transmitting additional information to the TRP using the corresponding slot identified by the slot allocation.

In some examples of the method, apparatuses, and non-transitory computer-readable medium described herein, the additional information may be in the form of a physical uplink shared channel (PUSCH) payload, a scheduling request (SR), or a channel state information (CSI) report, and where the feedback may be combined with the additional information on a single uplink channel.

In some examples of the method, apparatuses, and non-transitory computer-readable medium described herein, transmitting feedback to the TRP using the corresponding slot may include operations, features, means, or instructions for transmitting the feedback via at least one of a physical uplink control channel (PUCCH) or as piggybacked uplink control information (UCI) via a PUSCH.

In some examples of the method, apparatuses, and non-transitory computer-readable medium described herein, the feedback transmitted to the TRP using the corresponding slot includes feedback information pertaining to only one PDSCH of multiple time-domain resource allocations having a same ending OFDM symbol.

In some examples of the method, apparatuses, and non-transitory computer-readable medium described herein, determining the one or more TRP-specific uplink parameters for feedback transmissions to the TRP may include operations, features, means, or instructions for identifying that QCL information may be configured for PUCCH transmissions and identifying TRP-specific QCL information for the TRP for the corresponding slot.

In some examples of the method, apparatuses, and non-transitory computer-readable medium described herein, determining the one or more TRP-specific uplink parameters for feedback transmissions to the TRP may include operations, features, means, or instructions for identifying TRP-specific power control parameters for transmissions to the TRP for the corresponding slot.

In some examples of the method, apparatuses, and non-transitory computer-readable medium described herein, the TRP-specific power control parameters may include at least one of an open-loop power control parameter and a closed-loop power control parameter.

In some examples of the method, apparatuses, and non-transitory computer-readable medium described herein, determining the one or more TRP-specific uplink parameters for feedback transmissions to the TRP may include operations, features, means, or instructions for identifying TRP-specific TA parameters for transmissions to the TRP for the corresponding slot.

In some examples of the method, apparatuses, and non-transitory computer-readable medium described herein, receiving the slot allocation may include operations, features, means, or instructions for receiving the slot allocation via radio resource control (RRC) signaling.

Some examples of the method, apparatuses, and non-transitory computer-readable medium described herein may further include operations, features, means, or instructions for determining to transmit a set of HARQ acknowledgement feedback messages to the TRP of the set of TRPs, identifying a set of slots based on the slot allocation to transmit the set of HARQ acknowledgement feedback messages to the TRP, and transmitting the set of HARQ acknowledgement feedback messages to the TRP in the identified set of slots.

A method of wireless communication at a TRP is described. The method may include identifying, at the TRP, a slot allocation of at least one slot to be used by a UE to provide HARQ-ACK feedback to the TRP, transmitting a downlink message to the UE, transmitting an indication that the UE is to provide HARQ-ACK feedback using the at least one slot identified by the slot allocation, and receiving, from the UE and on the at least one slot identified by the slot allocation, HARQ-ACK feedback pertaining to the downlink message.

An apparatus for wireless communication at a TRP is described. The apparatus may include a processor, memory coupled with the processor, and instructions stored in the memory. The instructions may be executable by the processor to cause the apparatus to identify, at the TRP, a slot allocation of at least one slot to be used by a UE to provide HARQ-ACK feedback to the TRP, transmit a downlink message to the UE, transmit an indication that the UE is to provide HARQ-ACK feedback using the at least one slot identified by the slot allocation, and receive, from the UE and on the at least one slot identified by the slot allocation, HARQ-ACK feedback pertaining to the downlink message.

Another apparatus for wireless communication at a TRP is described. The apparatus may include means for identifying, at the TRP, a slot allocation of at least one slot to be used by a UE to provide HARQ-ACK feedback to the TRP, transmitting an indication that the UE is to provide HARQ-ACK feedback using the at least one slot identified by the slot allocation, and receiving, from the UE and on the at least one slot identified by the slot allocation, HARQ-ACK feedback pertaining to the downlink message.

A non-transitory computer-readable medium storing code for wireless communication at a TRP is described. The code may include instructions executable by a processor to identify, at the TRP, a slot allocation of at least one slot to be used by a UE to provide HARQ-ACK feedback to the TRP, transmit a downlink message to the UE, transmit an indication that the UE is to provide HARQ-ACK feedback using the at least one slot identified by the slot allocation, and receive, from the UE and on the at least one slot identified by the slot allocation, HARQ-ACK feedback pertaining to the downlink message.

Some examples of the method, apparatuses, and non-transitory computer-readable medium described herein may further include operations, features, means, or instructions for transmitting the slot allocation to one or more other TRPs in communication with the UE to facilitate slot allocation coordination between the TRP and the one or more other TRPs, receiving, from the one or more other TRPs, additional slot allocations identifying slots to be used by the UE to provide HARQ-ACK feedback to the one or more other TRPs, where each slot identified in the slot allocation and the additional slot allocations may be allocated for feedback transmissions by the UE to only one TRP, or a combination thereof.

In some examples of the method, apparatuses, and non-transitory computer-readable medium described herein, the slots may be allocated asymmetrically between the TRP and the additional TRPs.

In some examples of the method, apparatuses, and non-transitory computer-readable medium described herein, transmitting the indication may include operations, features, means, or instructions for transmitting the indication via a DCI message.

Some examples of the method, apparatuses, and non-transitory computer-readable medium described herein may further include operations, features, means, or instructions for transmitting a DCI message that includes an indication of a size of a HARQ-ACK codebook to be used by the UE in providing feedback to the TRP.

Some examples of the method, apparatuses, and non-transitory computer-readable medium described herein may further include operations, features, means, or instructions for transmitting at least one semi-static TRP-specific parameter to the UE.

In some examples of the method, apparatuses, and non-transitory computer-readable medium described herein, the at least one TRP-specific parameter may be one or more of a number of cells supported by the TRP for CA, a cell-specific uplink-downlink configuration associated with a cell of the TRP, a per-BWP table of time-domain resource allocation for PDSCHs for the TRP, a per-BWP set of parameters defining PDSCH to feedback timing for the TRP, or a per-BWP PDSCH repetition factor for the TRP.

In some examples of the method, apparatuses, and non-transitory computer-readable medium described herein, receiving HARQ-ACK feedback pertaining to the downlink message may include operations, features, means, or instructions for receiving the HARQ-ACK feedback on the at least one slot identified by the slot allocation only if the at least one slot may be identified as an uplink slot by a cell-specific uplink-downlink configuration associated with the TRP.

In some examples of the method, apparatuses, and non-transitory computer-readable medium described herein, receiving HARQ-ACK feedback pertaining to the downlink message may include operations, features, means, or instructions for receiving the HARQ-ACK feedback on symbols of the at least one slot identified by the slot allocation only if the symbols of the at least one slot may be allocated for uplink transmissions by a cell-specific uplink-downlink configuration associated with the TRP.

Some examples of the method, apparatuses, and non-transitory computer-readable medium described herein may further include operations, features, means, or instructions for receiving additional information from the UE using the at least one slot identified by the slot allocation.

In some examples of the method, apparatuses, and non-transitory computer-readable medium described herein, the additional information may be in the form of a PUSCH payload, an SR, or a CSI report, and where the HARQ-ACK feedback may be combined with the additional information on a single uplink channel.

In some examples of the method, apparatuses, and non-transitory computer-readable medium described herein, receiving HARQ-ACK feedback pertaining to the downlink message may include operations, features, means, or instructions for receiving the HARQ-ACK feedback via at least one of a PUCCH or as piggybacked UCI via a PUSCH.

In some examples of the method, apparatuses, and non-transitory computer-readable medium described herein, transmitting the downlink message to the UE may include operations, features, means, or instructions for transmitting only one PDSCH with a time-domain resource allocation having a same ending OFDM symbol per slot from the TRP.

In some examples of the method, apparatuses, and non-transitory computer-readable medium described herein, the HARQ-ACK feedback received from the UE in the at least one slot includes feedback information pertaining to only one PDSCH of multiple time-domain resource allocations having a same ending OFDM symbol.

Some examples of the method, apparatuses, and non-transitory computer-readable medium described herein may further include operations, features, means, or instructions for transmitting TRP-specific QCL information to the UE.

Some examples of the method, apparatuses, and non-transitory computer-readable medium described herein may further include operations, features, means, or instructions for transmitting TRP-specific power control parameters to the UE for transmissions to the TRP during the at least one slot.

Some examples of the method, apparatuses, and non-transitory computer-readable medium described herein may further include operations, features, means, or instructions for transmitting TRP-specific TA parameters to the UE for transmissions to the TRP during the at least one slot.

Some examples of the method, apparatuses, and non-transitory computer-readable medium described herein may further include operations, features, means, or instructions for transmitting the slot allocation via RRC signaling.

DETAILED DESCRIPTION

Figure 1:
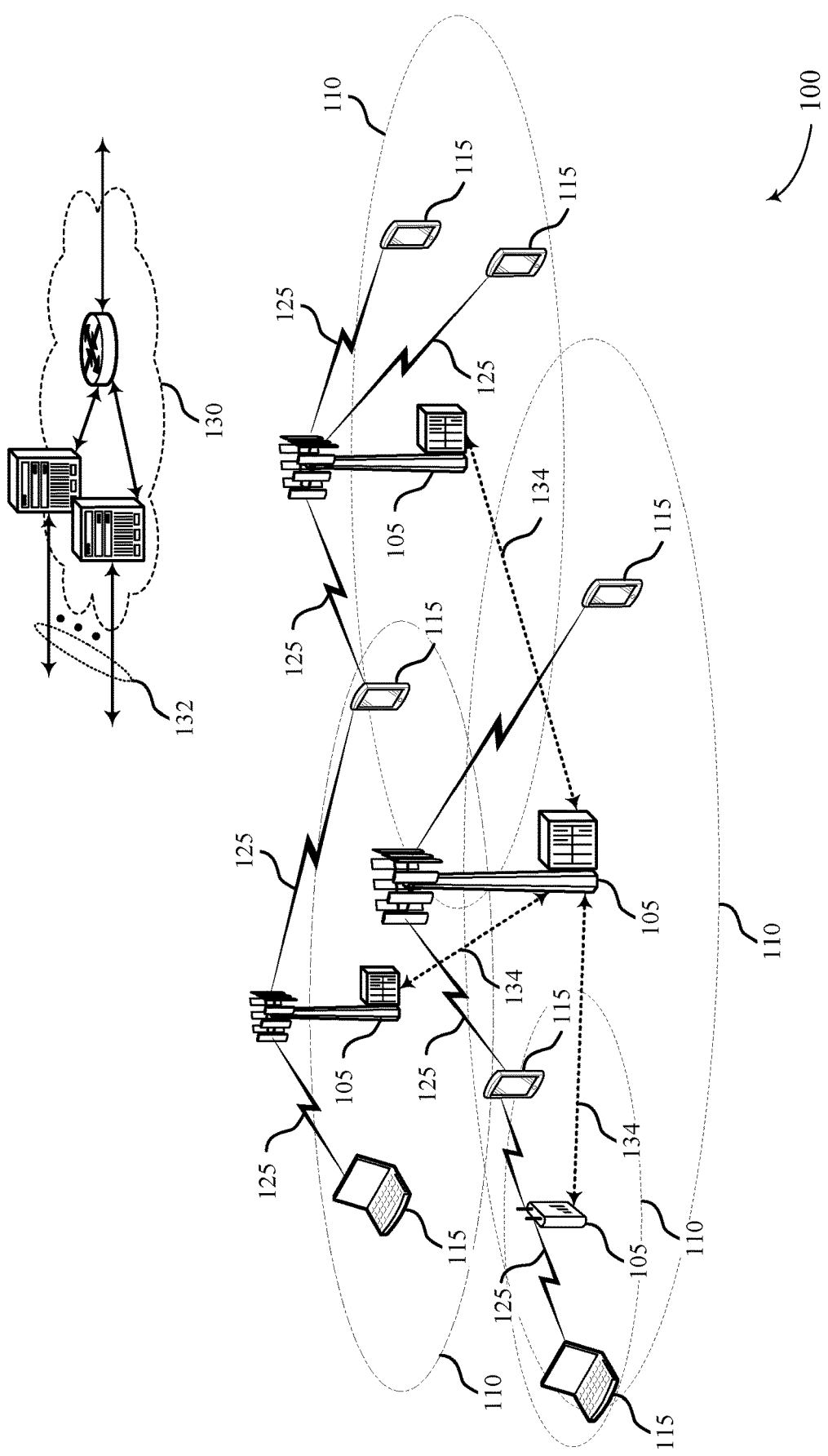
FIG. 1 illustrates an example of a system for wireless communications that supports acknowledgement (ACK) codebook design for multiple transmission reception points (TRPs) in accordance with aspects of the present disclosure.

In some wireless communications systems, multiple transmission reception points (TRPs) may communicate with a same user equipment (UE) at the same or different time in a non-coherent manner (e.g., Non-Coherent Joint Transmission (NCJT)). For example, the multiple TRPs may be able to transmit physical downlink control channel (PDCCH) and/or physical downlink shared channel (PDSCH) messages to the UE (based on radio resource control (RRC) configuration). Additionally, the multiple TRPs may coordinate semi-statically with respect to different downlink channel, uplink channel, and reference signal (RS) configuration due to a non-ideal backhaul connection between the TRPs (e.g., an increased latency over the backhaul connection). Based on the non-ideal backhaul connection, the multiple TRPs may not be able to coordinate fast enough and, as such, may send separate PDCCH and PDSCH transmissions, where the UE may be expected to transmit hybrid automatic repeat request (HARQ) acknowledgement (ACK) feedback for each downlink transmission based on a HARQ-ACK codebook. However, while the UE may receive the multiple downlink transmissions simultaneously, the UE may be unable to transmit multiple uplink ACK feedback messages simultaneously.

To mitigate the need to transmit multiple uplink ACK feedback messages simultaneously, a scheduling TRP (e.g., a base station, the network, a giga-NodeB (gNB), etc.) may configure the UE with a slot allocation for physical uplink control channel (PUCCH) feedback per TRP. For example, a first slot may be allocated for ACK feedback in a PUCCH to a first TRP, a second slot may be allocated for ACK feedback in a PUCCH to a second TRP, etc. Accordingly, ACK/negative ACK (NACK) feedback to different TRPs may not be transmitted within a same slot. The slot allocation may be explicitly indicated to the UE by the scheduling TRP, such that the UE knows which slot corresponds to which TRP and transmits the ACK/NACK feedback based on the slot/TRP configuration. Additionally, the UE may determine a different HARQ-ACK codebook for each slot/TRP based on each TRP having different parameters that are used for a codebook determination. In some cases, the UE may semi-statically determine the HARQ-ACK codebook for each TRP and use the respective HARQ-ACK codebook in each slot for the corresponding TRP. Additionally or alternatively, the HARQ-ACK codebook may be dynamically indicated by the scheduling TRP, where the scheduling TRP indicates the information to enable the UE to construct the HARQ-ACK codebook in each ACK feedback transmission. In some cases, quasi co-location (QCL), power control, and timing advance (TA) may also be specific to each slot/TRP.

Particular aspects of the subject matter described herein may be implemented to realize one or more advantages. The described techniques may support improvements in transmitting ACK feedback to a TRP for a received downlink channel message, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. An additional wireless communications system, a slot allocation, a downlink channel schedule, an uplink channel repetition configuration, and a process flow are then provided to illustrate aspects of the disclosure. Aspects of the disclosure are further illustrated by and described with reference to apparatus diagrams, system diagrams, and flowcharts that relate to ACK codebook design for multiple TRPs.

FIG. 1 illustrates an example of a wireless communications system 100 that supports ACK codebook design for multiple TRPs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105). Additionally or alternatively, a base station 105 as described herein may be referred to as a TRP 105.

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as Tf=307, 200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a UE 115 may communicate with one or more TRPs 105 (e.g., base stations 105) using a NCJT scheme. The NCJT scheme may enable joint transmissions (JTs) to the multiple TRPs 105. Various NCJT techniques may have a lower requirement for the backhaul speed, capacity, latency, etc., between TRPs 105, and may allow transmissions to or from each TRP 105 as independent data streams. A TRP 105 may indicate an NCJT mode for the UE 115 to receive corresponding JTs from the TRP 105 and other TRPs 105. The UE 115 may then receive the downlink JTs based on the indicated NCJT mode from each TRP 105 simultaneously, where the downlink JTs may be PDCCH or PDSCH transmissions to the UE 115 from the TRPs 105 (e.g., based on an RRC configuration). In some cases, the downlink JTs may indicate for the UE 115 to transmit uplink information in response to the downlink JTs. For example, the UE 115 may be expected to transmit HARQ-ACK feedback to respective TRPs 105 after receiving the downlink JTs to indicate whether the downlink JTs were successfully received and decoded (e.g., ACK indicates a successful reception and decoding, while a NACK indicates an unsuccessful reception and/or decoding).

The multiple TRPs 105 may coordinate semi-statically with respect to PDSCH, PDCCH, physical uplink control channel (PUCCH), physical uplink shared channel (PUSCH), and/or RS configurations due to a non-ideal backhaul between the TRPs 105. The non-ideal backhaul may indicate a level of delay for communications between the TRPs 105 (e.g., greater than five (5) ms)) and a limited capacity for the backhaul link 132. Additionally, the non-ideal backhaul condition may imply that each TRP 105 sends a separate PDCCH and PDSCH to the UE 115, where the PDCCHs may appear in different control resource sets (CORESETs) within a same slot and the PDSCHs may appear in a same slot. As such, as noted above, the UE 115 may transmit HARQ-ACK feedback to each TRP 105 for each PDCCH or PDSCH received.

In some cases, the UE 115 may determine a HARQ-ACK codebook for identifying timing-domain resource allocations for downlink transmissions (e.g., PDCCH or PDSCH) from a TRP 105 and for identifying when to transmit the HARQ-ACK feedback after receiving the downlink transmissions. For example, a scheduling TRP 105 may transmit a downlink control information (DCI) message dynamically to the UE 115 that indicates information for enabling the UE 115 to dynamically construct a HARQ-ACK codebook for each downlink transmission received that necessitates a HARQ-ACK feedback message transmission. Additionally or alternatively, the UE 115 may determine the HARQ-ACK codebook semi-statically (e.g., RRC signaling) based on information from a TRP 105, where the codebook does not change from transmission to transmission. In some cases, the HARQ-ACK codebook may be determined from a number of parameters, including a cell-specific uplink-downlink configuration, a table of time-domain resource allocations for PDSCH, a set of k1 values (e.g., PDSCH-to-HARQ timelines), a number of cells (e.g., in a CA configuration), a PDSCH repetition factor, or a combination thereof. The k1 values may indicate a number of TTIs (e.g., slots) between receiving a downlink channel message (e.g., PDSCH) and transmitting a corresponding HARQ-ACK message. Additionally, an example of the table of time-domain resource allocation for a PDSCH is given below in Table 1. $K_0$ indicates a slot offset for the PDSCH, S indicates the starting symbol of the PDSCH, and L indicates the length of the PDSCH (e.g., in symbols).

TABLE 1

Default PDSCH Time Domain Resource Allocation for Normal Cyclic Prefix

| Row Index | DMRS-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 8 |
|  | 3 | Type A | 0 | 3 | 7 |
| 4 | 2 | Type A | 0 | 2 | 6 |
|  | 3 | Type A | 0 | 3 | 5 |
| 5 | 2 | Type A | 0 | 2 | 4 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In some cases, based on the information in Table 1, the UE 115 may determine that two or more PDSCH time-domain resource allocations indicate that two or more corresponding PDSCHs have a same ending OFDM symbol. Accordingly, the UE 115 may not be expected to receive more than one PDSCH in a same slot for the two or more allocations. Additionally, the UE 115 may only determine the HARQ-ACK codebook when communicating with one TRP 105. As such, when communicating with multiple TRPs 105, the UE 115 may be expected to transmit a feedback message (e.g., HARQ-ACK feedback) to each TRP 105 but may be unable to determine a HARQ-ACK codebook for the multiple TRPs 105 or may be unable to transmit multiple feedback messages at the same time. In some cases, the UE 115 may choose one TRP 105 to respond to (e.g., based on a priority or similar criterion) or may not respond to any of the TRPs 105. However, refraining from transmitting one or more feedback messages may lead to inefficient communications and unnecessary retransmissions.

Wireless communications system 100 may support efficient techniques for allocating separate slots or time durations for corresponding transmissions to separate TRPs 105. For example, a scheduling TRP 105 (e.g., a gNB, base station 105, the network, etc.) may configure a UE 115 with a slot allocation for PUCCH feedback between different TRPs 105, such that ACK feedback to different TRPs may not occur with a same slot. Additionally, each TRP 105 may have different parameters for determining a corresponding HARQ-ACK codebook (e.g., TRP-specific parameters), and the UE 115 may then determine the HARQ-ACK codebook semi-statically in each slot for each TRP 105. TRP-specific uplink parameters may also be the same within each slot for each TRP 105, where the TRP-specific uplink parameters include QCL information, power control parameters, TA parameters, or a combination thereof. For time-domain resource allocations that have a same ending OFDM symbol for corresponding PDSCHs, the UE 115 may not be expected to receive more than one PDSCH in a same slot from a same TRP 105 or provide HARQ-ACK feedback for more than one PDSCH in a same slot in a same HARQ-ACK feedback message.

Figure 2:
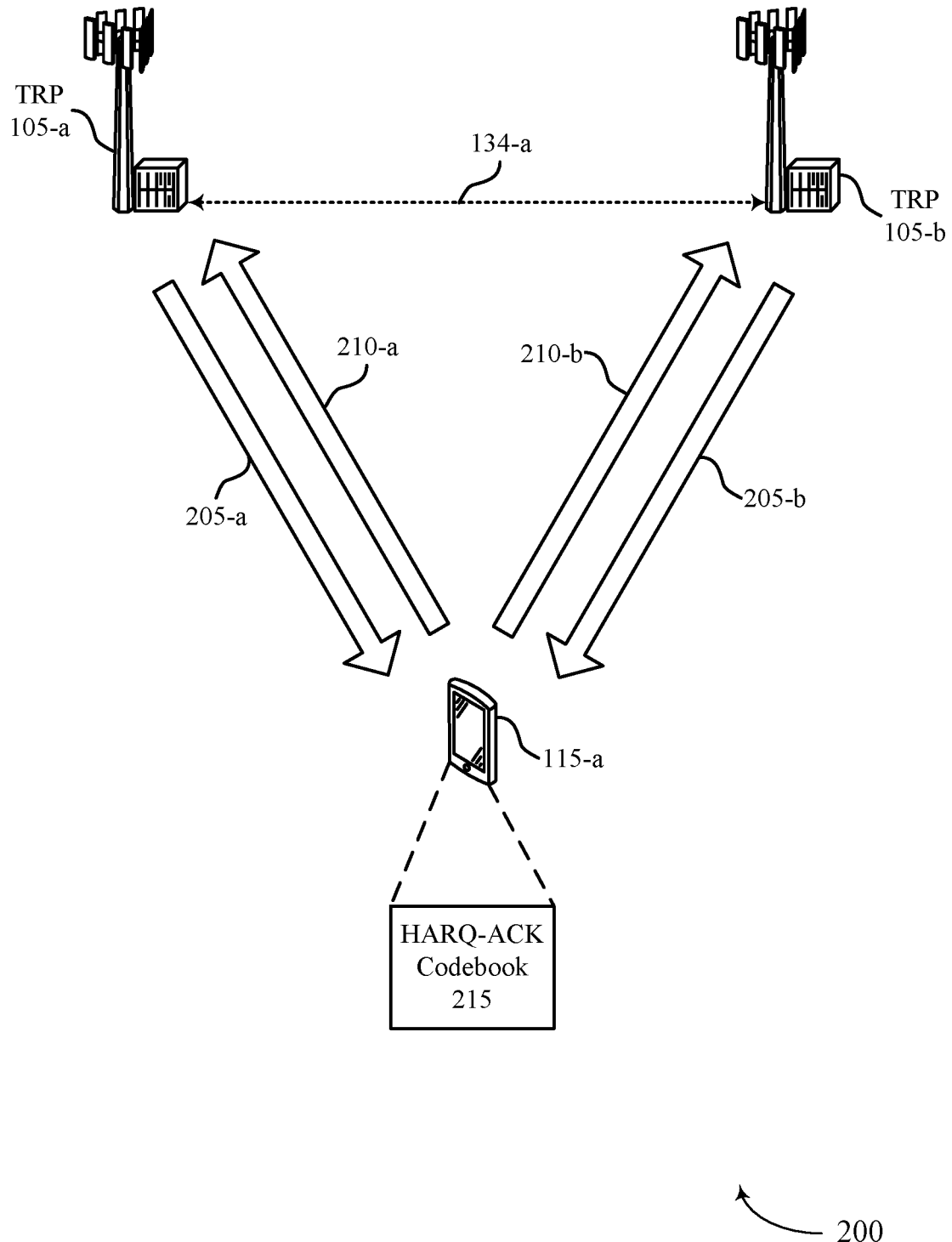
FIG. 2 illustrates an example of a wireless communications system that supports ACK codebook design for multiple TRPs in accordance with aspects of the present disclosure.

FIG. 2 illustrates an example of a wireless communications system 200 that supports ACK codebook design for multiple TRPs in accordance with aspects of the present disclosure. In some examples, wireless communications system 200 may implement aspects of wireless communications system 100. Wireless communications system 200 may include a TRP 105-a, a TRP 105-b, and a UE 115-a, which may be examples of base stations 105 (or TRPs 105) and UEs 115, respectively, as described herein with reference to FIG. 1. As described herein, TRP 105-a and TRP 105-b may communicate with UE 115-a at a same time or a different time based on a NCJT scheme as described above. Additionally, TRP 105-a and TRP 105-b may have a non-ideal backhaul link 134-a between each other, leading to each TRP 105 sending separate PDCCHs and/or PDSCHs in separate downlink transmissions 205 (e.g., TRP 105-a may send downlink transmission 205-a and TRP 105-b may send downlink transmission 205-b). UE 115-a may then be expected to transmit HARQ-ACK feedback to each TRP 105 on uplink transmissions 210 to indicate whether the corresponding downlink transmissions 205 were correctly received.

As described herein, to prevent transmitting multiple uplink messages (e.g., multiple uplink transmissions 210) simultaneously, a slot allocation may be configured where ACK/NACK feedback for different TRPs 105 at the slot level may be semi-statically TDMed. For example, TRP 105-a (e.g., a master TRP 105, a scheduling TRP 105, the network, etc.) may configure UE 115-a with a slot allocation for PUCCH feedback between the different TRPs 105. In some cases, the slot allocation may be asymmetric. For example, a first slot may be allocated to TRP 105-a, a second slot may be allocated to TRP 105-a, a third slot may then be allocated to TRP 105-b, a fourth slot may be allocated back to TRP 105-a, a fifth slot may be allocated to TRP 105-a as well, a fifth slot may then be allocated for TRP 105-b, etc. Additionally or alternatively, the slots may be allocated in an alternating pattern between the two TRPs 105. For example, even slots may be allocated for TRP 105-a, and odd slots may be allocated for TRP 105-b.

Based on the slot allocation, ACK/NACK feedback to different TRPs 105 may not occur in a same slot, and network scheduling may guarantee that ACK/NACK feedback is confined to one TRP 105 per slot. For example, TRP 105-a and TRP 105-b (e.g., or any two TRPs 105) may semi-statically coordinate over non-ideal backhaul link 134-a for the HARQ-ACK feedback (e.g., ACK/NACK feedback). Additionally, there may be no restriction on PDSCH scheduling between the TRPs 105 and UE 115-a. For example, UE 115-a may receive multiple PDSCHs from both TRP 105-a and TRP 105-b within a same slot. In some cases, the slot allocation may be used for PUSCH and other uplink control information (UCI) (e.g., scheduling requests (SRs), channel state information (CSI) reports, etc.) rather than only HARQ-ACK transmissions. Accordingly, UE 115-a may piggyback UCI (e.g., the HARQ-ACK, SRs, CSI reports, etc.) on the PUSCHs.

With the slot allocation, both dynamic and semi-static HARQ-ACK codebooks may be supported at UE 115-a. For example, UE 115-a may determine a HARQ-ACK codebook 215 for a TRP 105 in each slot. Based on the uplink slot allocation between TRPs, UE 115-a may use TRP-specific parameters to determine a semi-static HARQ-ACK codebook for each TRP 105 for a given slot. The TRP-specific parameters may differ for each TRP 105. For example, TRP 105-a may have a different number of cells (e.g., in CA), a different cell-specific uplink-downlink configuration (e.g., per cell), a different table of time-domain resource allocations for PDSCH (e.g., per bandwidth part (BWP)), a different set of k1 values (e.g., PDSCH-to-HARQ timing per BWP), a different PDSCH repetition factor, or a combination thereof than TRP 105-b. Accordingly, UE 115-a may have a different set of TRP-specific parameters for each TRP 105 based on signaling from each TRP 105 that indicates one or more of the described parameters. In addition to indicating the number of cells that a TRP 105 supports, the TRP 105 may also indicate the cell identifications (IDs) that the TRP 105 supports. As such, UE 115-a may generate a semi-static HARQ-ACK codebook for a given TRP 105 and may skip a particular cell if that cell is not supported by the given TRP 105. For example, TRP 105-a may operate over a first cell (e.g., with a first cell ID), and TRP 105-b may operate over a second cell (e.g., with a second cell ID). Based on the indication of which cells they operate over, UE 115-a may report HARQ-ACK for PDSCHs received in cell A to TRP 105-a (e.g., in a slot allocated for TRP 105-a) and for PDSCHs received in cell B to TRP 105-b (e.g., in a slot allocated for TRP 105-b) based on respective HARQ-ACK codebooks generated for each TRP 105.

After identifying and/or determining the TRP-specific parameters for each TRP 105, UE 115-a may also know which slot is allocated for which TRP 105 based on the configured slot allocation (e.g., signaled to UE 115-a explicitly) and may then know which parameters to use for determining HARQ-ACK codebook 215 for subsequent uplink transmissions (e.g., HARQ-ACK feedback) in the slot. Accordingly, UE 115-a may transmit the ACK/NACK feedback on a PUCCH and/or on a PUSCH (e.g., via piggybacking).

In some cases, the table of time-domain resource allocations for PDSCH may indicate that two or more PDSCHs may end on the same OFDM symbol. As such, for time-domain resource allocations that have a same ending OFDM symbol for corresponding PDSCHs, UE 115-a may not be expected to receive more than one PDSCH in a same slot from a same TRP 105 or to provide HARQ-ACK feedback for more than one PDSCH in a same slot in a same HARQ-ACK feedback message. Additionally or alternatively, UE 115-a may receive two PDSCHs with a same ending OFDM symbol from two different TRPs 105. For example, TRP 105-a may transmit a first PDSCH, and TRP 105-b may transmit a second PDSCH, where both PDSCHs end on the same OFDM symbol. Accordingly, UE 115-a may be expected to receive each PDSCH from the respective TRP 105 even though they end on the same OFDM symbol.

Additionally or alternatively, UE 115-a may not be expected to receive more than one PDSCH in a same slot on overlapping time-domain resource allocations. For example, if two or more PDSCHs (e.g., PDSCH occasions) overlap in time (e.g., regardless of whether the PDSCHs end on a same OFDM symbol or not), UE 115-a may feedback one (1) HARQ-ACK for a given TRP 105. As such, UE 115-a may transmit HARQ-ACK feedback for a first PDSCH received in a slot, but not for any subsequent PDSCHs received in the same slot that overlap in the time-domain with the first PDSCH. Additionally, in some cases, UE 115-a may determine to transmit the single HARQ-ACK feedback for the first PDSCH based on the overlapping PDSCHs being received from a same TRP 105.

Additionally, one or more TRP-specific uplink parameters may differ per slot or TRP 105. For example, QCL information for PUCCH may be configured per PUCCH resource (within a slot). The QCL information may determine the spatial-domain parameters for the PUCCH transmission. To support semi-static TDM of PUCCHs for multiple TRPs 105, UE 115-a may need to apply different QCL parameters (e.g., QCL information) to different slots (e.g., depending on slot allocation among TRPs 105). For example, in a slot n, if slot n is an uplink slot allocated for TRP 105-a, then UE 115-a may follow a corresponding QCL condition for the PUCCH transmission. This QCL consideration may be used for frequency range 2 (FR2) (e.g., range for mmW communications). If the QCL information is not configured for PUCCH (e.g., in frequency range 1 (FR1)), UE 115-a may use the same QCL parameters for PUCCH transmissions to different TRPs 105 (e.g., TRP 105-b). Additionally, other TRP-specific uplink parameters may be applied to the different slots per TRP 105. For example, different power control parameters may be applied to the different slots (e.g., depending on the slot allocation among TRPs 105) and/or different TAs may be assumed in the different slots. In some cases, the one or more TRP-specific uplink parameters may be signaled to UE 115-a through both DCI and semi-static (e.g., RRC signaling) messaging.

Figure 3:
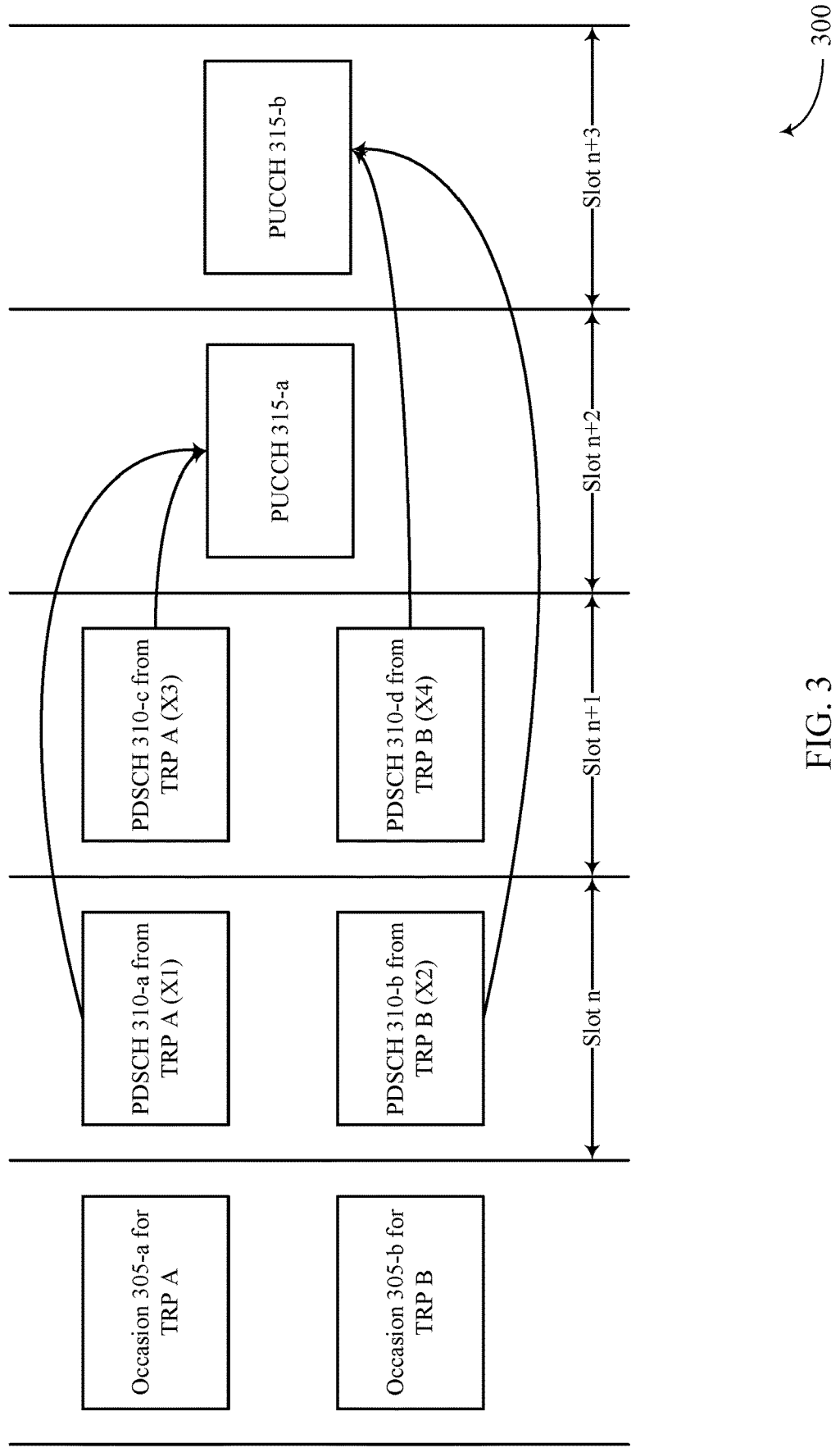
FIG. 3 illustrates an example of a slot allocation that supports ACK codebook design for multiple TRPs in accordance with aspects of the present disclosure.

FIG. 3 illustrates an example of a slot allocation 300 that supports HARQ ACK codebook design for multiple TRPs in accordance with aspects of the present disclosure. In some examples, slot allocation 300 may implement aspects of wireless communications systems 100 and/or 200. As described herein, slot allocation 300 may be configured for a UE 115 to receive one or more downlink messages from multiple TRPs 105 and then transmit uplink messages to each TRP 105 within a separate slot allocated for the corresponding TRP 105.

An occasion 305-a for a first TRP A (e.g., a first TRP 105) may be configured for the UE 115, and an occasion 305-b for a second TRP B (e.g., a second TRP 105) may be configured for the UE 115. Each occasion 305 may occupy a different BWP or a different set of RBs of a total bandwidth, such that the two occasions 305 occupy separate frequencies. Additionally or alternatively, occasions 305 from different TRPs may occupy the same time and frequency resources and may be separated in the spatial domain using different spatial layers (e.g., if the UE 115 supports MIMO reception). As such, the UE 115 may receive multiple PDSCHs 310 from both TRP A and TRP B within a same slot on different resources (e.g., based on the different BWPs, RBs, spatial layers, etc.). For example, the UE 115 may receive a first PDSCH 310-a from TRP A and a second PDSCH 310-b from TRP B within a slot n. Additionally, the UE 115 may receive a third PDSCH 310-c from TRP A and a fourth PDSCH 310-d from TRP B within a slot n+1. In some cases, the UE 115 may be expected to transmit HARQ-ACK feedback for each PDSCH 310 to the corresponding TRP. However, if the UE 115 were to transmit multiple PUCCHs 315 to each TRP within a same slot, collisions may occur that compromise either one or both PUCCHs 315. In some cases, the UE 115 may be unable to determine separate HARQ-ACK codebooks for the separate TRPs (e.g., based on separate TRP-specific parameters for determining a HARQ-ACK codebook) within a same slot. Additionally or alternatively, the UE 115 may be unable to determine separate HARQ-ACK codebooks for the separate TRPs based on the separate TRPs having different TRP-specific uplink parameters. Accordingly, the UE 115 may be unable or may refrain from transmitting PUCCHs 315 to more than one TRP at a time.

A scheduling TRP or base station 105 may configure the UE 115 with a slot allocation for PUCCH 315 feedback between the different TRPs. For example, slot n+2 may be allocated for a first PUCCH 315-a that is transmitted to TRP A for HARQ-ACK feedback for first PDSCH 310-a and third PDSCH 310-c. Additionally, slot n+3 may be allocated for a second PUCCH 315-b that is transmitted to TRP B for HARQ-ACK feedback for second PDSCH 310-b and fourth PDSCH 310-d. The scheduling TRP or base station 105 may explicitly indicate which slot is allocated for which TRP to the UE 115. In some cases, each TRP may indicate the slot for transmitting the HARQ-ACK feedback for a corresponding PDSCH 310 via DCI that contains the scheduling grant of that corresponding PDSCH 310. For example, the TRP may transmit a DCI with a corresponding k1 value to indicate which slot a corresponding PUCCH 315 is to be transmitted in for the PDSCH 310. As shown in the example of slot allocation 300, the k1 value indicated in the DCI of first PDSCH 310-a may be two (2) slots, and the k1 value indicated in the DCI of third PDSCH 310-c may be one (1) slot, indicating that first PUCCH 315-a is to be transmitted two (2) slots after receiving first PDSCH 310-a and one (1) slot after receiving third PDSCH 310-c, respectively. Additionally or alternatively, the k1 value indicated in the DCI of second PDSCH 310-b may be three (3) slots, and the k1 value indicated in the DCI of fourth PDSCH 310-d may be two (2) slots, indicating that second PUCCH 315-b is to be transmitted three (3) slots after receiving second PDSCH 310-b and two (2) slots after receiving fourth PDSCH 310-d, respectively.

As described herein, the UE 115 may determine a separate HARQ-ACK codebook for each uplink slot (e.g., slot n+2 and slot n+3). Each TRP may have different TRP-specific parameters, leading the UE 115 to determine separate HARQ-ACK codebooks for each uplink slot corresponding to the allocated TRP. In some cases, the HARQ-ACK feedback may be transmitted by piggybacking the HARQ-ACK feedback onto a PUSCH rather than transmitting in a PUCCH 315. Additionally, each PUCCH 315 may have same TRP-specific uplink parameters (e.g., QCL information, power control parameters, TA parameters, etc.) as described above with reference to FIG. 2. Accordingly, each uplink slot may have a same HARQ-ACK codebook and same TRP-specific uplink parameters for messages (e.g., ACK/NACK feedback for each PDSCH 310) transmitted in each PUCCH 315.

Figure 4:
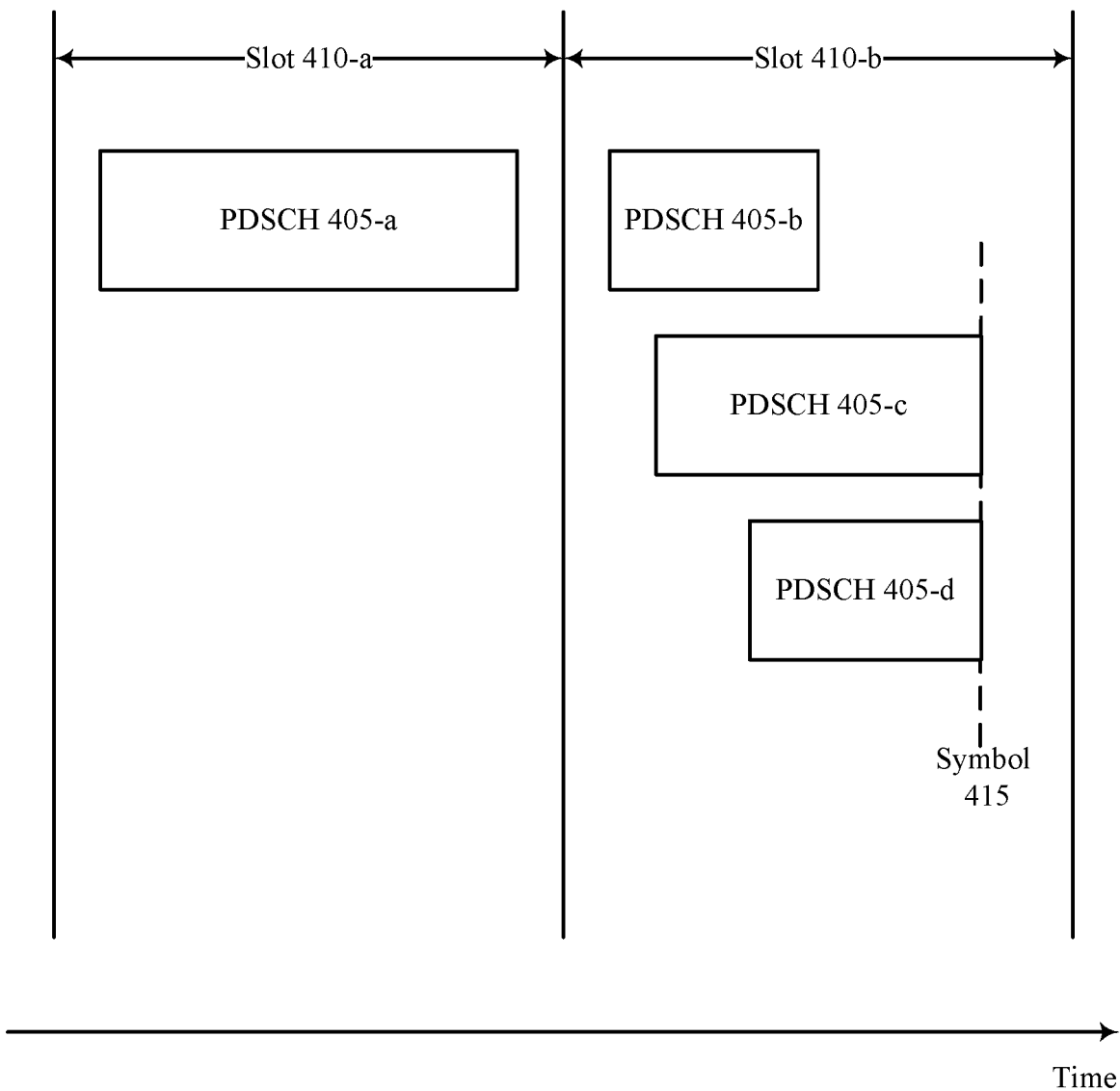
FIG. 4 illustrates an example of a downlink channel schedule that supports ACK codebook design for multiple TRPs in accordance with aspects of the present disclosure.

FIG. 4 illustrates an example of a downlink channel schedule 400 that supports ACK codebook design for multiple TRPs in accordance with aspects of the present disclosure. In some examples, downlink channel schedule 400 may implement aspects of wireless communications systems 100 and/or 200. Downlink channel schedule 400 may illustrate one or more PDSCHs 405 that are received at a UE 115 from one or more TRPs 105 (e.g., base stations 105) within multiple slots 410.

As shown, the UE 115 may receive a first PDSCH 405-a in a first slot 410-a. In some cases, first PDSCH 405-a may be the only downlink transmission that the UE 115 receives in slot 410-a. As such, the UE 115 may be able to decode first PDSCH 405-a successfully without any interference from additional downlink messages. Alternatively, the UE 115 may receive a second PDSCH 405-b, a third PDSCH 405-c, and a fourth PDSCH 405-d in a second slot 410-b. The UE 115 may determine the ending points of each PDSCH 405 based on a table of time-domain resource allocations for PDSCHs as described above (e.g., Table 1 in FIG. 1). Accordingly, the UE 115 may determine that second PDSCH 405-b ends at a symbol that does not coincide with any other PDSCHs 405 and, as such, may receive and decode the information in second PDSCH 405-b.

Alternatively, the UE 115 may determine that third PDSCH 405-c and fourth PDSCH 405-d may both have a same ending OFDM symbol 415. In some cases, third PDSCH 405-c and fourth PDSCH 405-d cannot be received from the same TRP. As such, the UE 115 may not be expected to receive more than one PDSCH 405 in a same slot 410 from the same TRP with the same ending OFDM symbol. Additionally, the UE 115 may not be expected to provide HARQ-ACK feedback for more than one PDSCH 405 with the same ending OFDM symbol in a same slot in a same HARQ-ACK feedback message. For example, the UE 115 may receive one of third PDSCH 405-c and fourth PDSCH 405-d from one TRP and then may transmit HARQ-ACK feedback for the chosen PDSCH 405 within a corresponding uplink slot allocated for the TRP. However, in some cases, the UE 115 may receive third PDSCH 405-c from a first TRP and may receive fourth PDSCH 405-d from a second TRP. Accordingly, the UE 115 may transmit the HARQ-ACK feedback for third PDSCH 405-c in a first slot that corresponds to the first TRP (e.g., based on the slot allocation per TRP as described herein) and may transmit the HARQ-ACK feedback for fourth PDSCH 405-d in a different slot that corresponds to the second TRP (e.g., different that the first slot corresponding to the first TRP).

Additionally or alternatively, if two or more PDSCHs 405 (e.g., PDSCH occasions) overlap in time (e.g., regardless of whether the PDSCHs 405 end on a same OFDM symbol or not), the UE 115 may feedback one (1) HARQ-ACK for a given TRP. That is, the UE 115 may not be expected to receive more than one PDSCH 405 in a same slot 410 on overlapping time-domain resource allocations. As such, the UE 115 may transmit HARQ-ACK feedback for second PDSCH 405-b received in second slot 410-b, but not for third PDSCH 405-c and fourth PDSCH 405-d based on both third PDSCH 405-c and fourth PDSCH 405-d overlapping in the time-domain with second PDSCH 405-b. Additionally, in some cases, the UE 115 may determine to transmit the single HARQ-ACK feedback for second PDSCH 405-b based on second PDSCH 405-b, third PDSCH 405-c, and fourth PDSCH 405-d being received from a same TRP.

Figure 5:
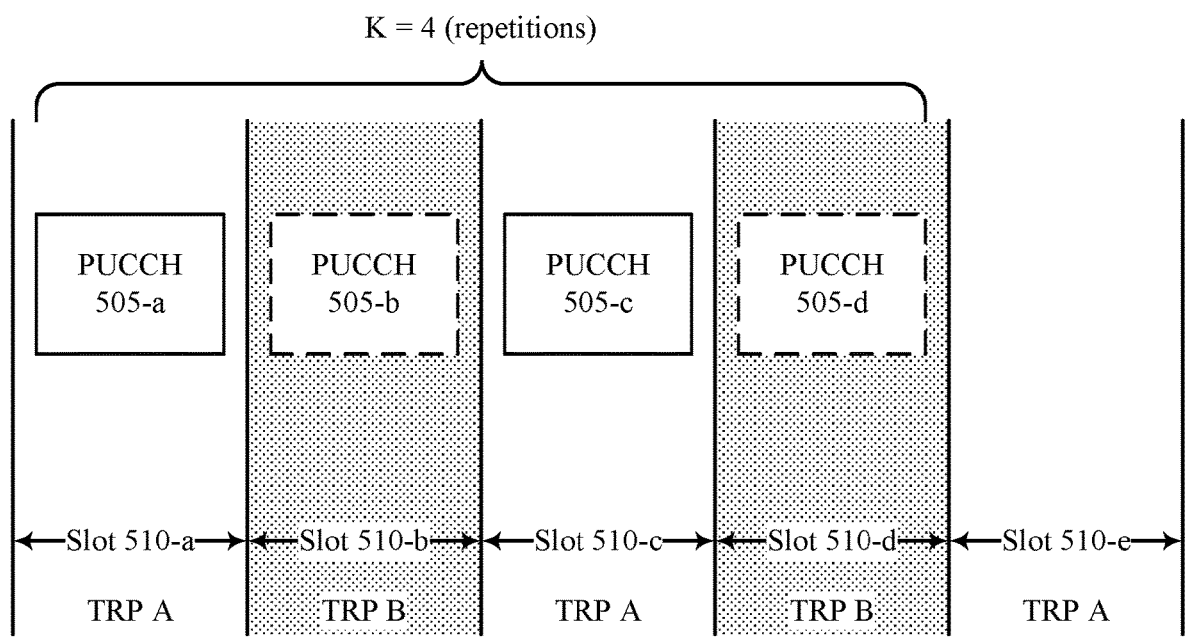
FIG. 5 illustrates an example of an uplink channel repetition configuration that supports ACK codebook design for multiple TRPs in accordance with aspects of the present disclosure.

FIG. 5 illustrates an example of an uplink channel repetition configuration 500 that supports ACK codebook design for multiple TRPs in accordance with aspects of the present disclosure. In some examples, uplink channel repetition configuration 500 may implement aspects of wireless communications systems 100 and/or 200. In some cases, when a UE 115 transmits HARQ-ACK feedback for a received PDSCH, the UE 115 may transmit the HARQ-ACK feedback in a PUCCH 505 (e.g., or a PUSCH). However, as described above, the UE 115 may transmit a PUCCH 505 over multiple slots 510 (e.g., slot aggregation, PUCCH repetition, etc.), and some of the slots 510 may be allocated for different TRPs. In some cases, the allocation of slots to different TRPs may be configured and signaled via higher layer signaling (e.g., RRC configured).

For example, as shown, the UE 115 may be scheduled to transmit a first PUCCH 505-a in a first slot 510-a, a second PUCCH 505-b in a second slot 510-b, a third PUCCH 505-c in a third slot 510-c, and a fourth PUCCH 505-d in a fourth slot 510-d (e.g., four (4) repetitions of the PUCCH/PUSCH in four (4) separate slots, such that K=4) to a first TRP (e.g., TRP A). However, the second slot 510-b and the fourth slot 510-d may be allocated to a second TRP (e.g., TRP B). Accordingly, the UE 115 may run into issues when determining which slots 510 to transmit the PUCCHs 505 (e.g., PUCCH repetitions) to TRP A based on the slots 510 being allocated to slots other than TRP A.

In some cases, as described herein, the UE 115 may transmit PUCCHs 505 for TRP A in slots 510 that are allocated to this TRP A and may skip the PUCCH 505 transmissions in the slots 510 that are allocated for other TRP(s). Additionally, the skipped PUCCH 505 transmissions may not be deferred to other slots 510. For example, as shown, the UE 115 may transmit the first PUCCH 505-a in the first slot 510-a and the third PUCCH 505-c in the third slot 510-c (e.g., transmit two repetitions of the PUCCH 505). Additionally or alternatively, the UE 115 may transmit K PUCCHs 505, where K is the configured repetition factor (e.g., K=4 as described above in the example of FIG. 5). Accordingly, the UE 115 may defer the skipped PUCCH 505 transmissions in the second slot 510-b and the fourth slot 510-d to other slots 510 that are allocated to TRP A. For example, the UE 115 may use slots 510 allocated to TRP A (e.g., the first slot 510-a, the third slot 510-c, a fifth slot 510-e, and a seventh slot 510) to transmit the four (4) repetitions of the PUCCH 505.

Additionally or alternatively, the UE 115 may transmit the PUCCHs 505 in K consecutive slots, as long as the starting slot 510 (e.g., the first slot 510) is allocated to the intended TRP (e.g., TRP A). Accordingly, the UE 115 may not expect to be dynamically scheduled any other uplink transmissions in the slots 510 that are not allocated to TRP A (e.g., the second slot 510-b and the fourth slot 510-d for TRP B in the example of FIG. 5) and may use these slots 510 for transmitting the PUCCHs 505 (e.g., PUCCH repetitions, PUSCHs, PUSCH repetitions, etc.). In some cases, any semi-statically configured uplink transmissions in the slots 510 allocated to other TRPs (e.g., the second slot 510-b and the fourth slot 510-d for TRP B in the example of FIG. 5) may be dropped (e.g., due to conflict with transmission/repetition of PUCCH 505 to TRP A). As such, the UE 115 may transmit the first PUCCH 505-a in the first slot 510-a, the second PUCCH 505-b in the second slot 510-b, the third PUCCH 505-c in the third slot 510-c, and the fourth PUCCH 505-d in the fourth slot 510-d to TRP A, even though the second slot 510-b and the fourth slot 510-d are (e.g., semi-statically) allocated to TRP B. Additionally or alternatively, the UE 115 may not expect that any of the scheduled slots 510 are allocated to other TRPs. For example, a base station 105 may indicate that the K consecutive slots are allocated to the same TRP (e.g., TRP A). As such, the UE 115 may consider the example shown in FIG. 5 is an error case since the second slot 510-*b* and the fourth slot 510-*d* are allocated to TRP B.

In some cases, the UE 115 may determine which configuration to use for transmitting the HARQ-ACK feedback (e.g., in the PUCCHs 505, PUSCHs, PUCCH/PUSCH repetitions, etc.) in the slots 510 based on signaling from a base station 105 (e.g., a serving base station 105). For example, the base station 105 may signal which slots to use for transmitting the HARQ-ACK feedback to a TRP (e.g., the base station 105) via higher layer signaling (e.g., RRC signaling), DCI, or additional types of downlink signaling.

Figure 6:
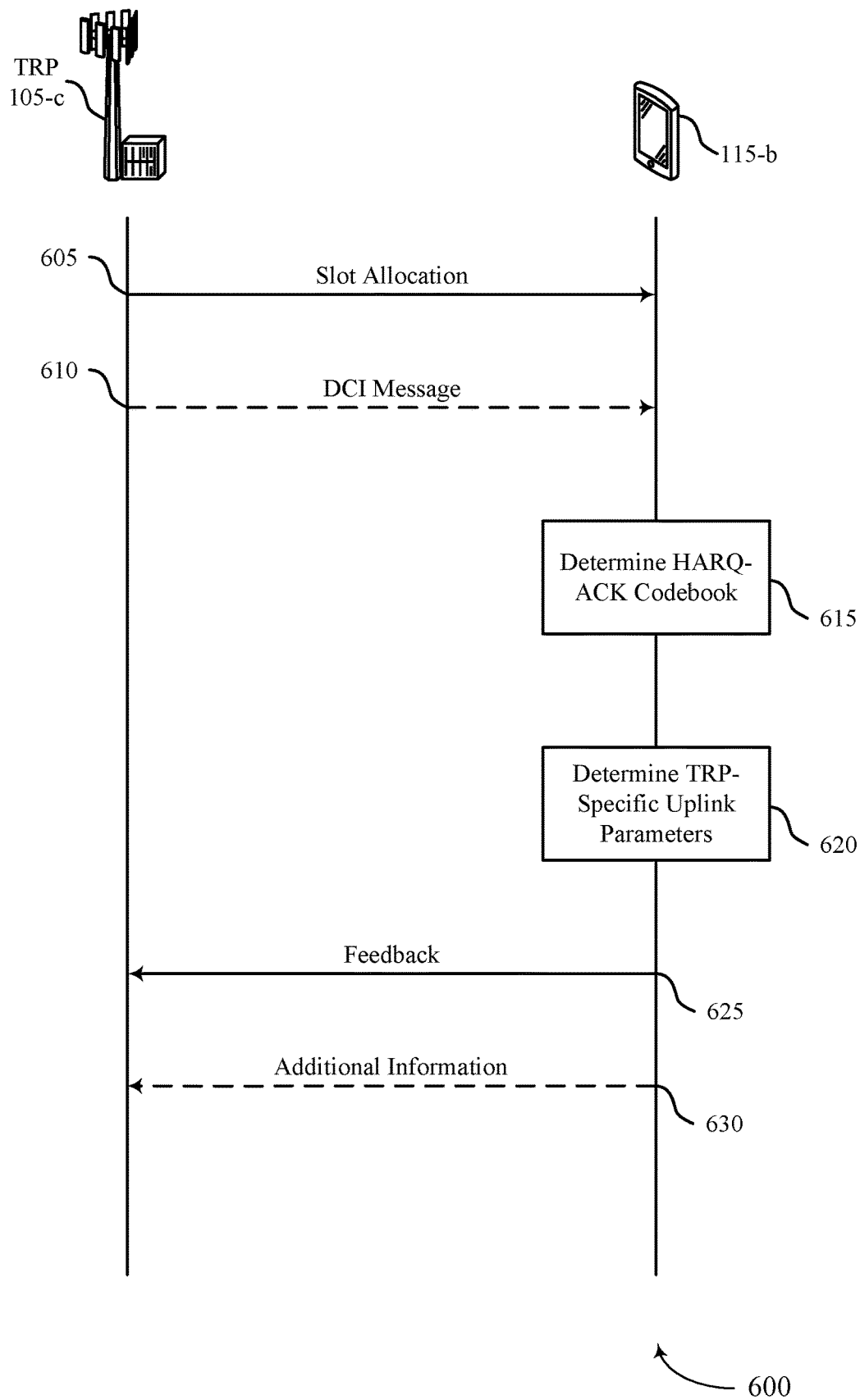
FIG. 6 illustrates an example of a process flow that supports ACK codebook design for multiple TRPs in accordance with aspects of the present disclosure.

FIG. 6 illustrates an example of a process flow 600 that supports ACK codebook design for multiple TRPs in accordance with aspects of the present disclosure. In some examples, process flow 600 may implement aspects of wireless communications systems 100 and/or 200. Process flow 600 may include a TRP 105-*c* and a UE 115-*b*, which may be examples of TRPs 105 (e.g., base stations 105) and UEs 115, respectively, as described herein with reference to FIGS. 1-5. As described herein, UE 115-*b* may be configured to communicate with multiple TRPs 105 simultaneously or at different times (e.g., including TRP 105-*c*).

In the following description of the process flow 600, the operations between UE 115-*b* and TRP 105-*c* may be performed in different orders or at different times. Certain operations may also be left out of the process flow 600, or other operations may be added to the process flow 600. It is to be understood that while UE 115-*b* and TRP 105-*c* are shown performing a number of the operations of process flow 600, any wireless device may perform the operations shown.

At 605, UE 115-*b* may receive a slot allocation to provide HARQ-ACK feedback to multiple TRPs 105. In some cases, UE 115-*b* may receive an allocation of slots to be used for providing HARQ-ACK feedback to different TRPs 105 of the multiple TRPs 105, where each slot identified in the slot allocation is allocated for feedback transmissions by UE 115-*b* to only one TRP 105 of the plurality of TRPs 105 (e.g., TRP 105-*c*). Additionally or alternatively, UE 115-*b* may receive an allocation of slots to be used for providing HARQ-ACK feedback to different TRPs 105 of the multiple TRPs 105, where the slots are allocated asymmetrically between the multiple TRPs 105. In some cases, UE 115-*b* may receive the slot allocation via RRC signaling.

Additionally, in some cases, TRP 105-*c* may identify the slot allocation of at least one slot to be used by UE 115-*b* to provide the HARQ-ACK feedback back to TRP 105-*c*. Accordingly, TRP 105-*c* may transmit the slot allocation to one or more other TRPs 105 in communication with UE 115-*b* to facilitate slot allocation coordination between TRP 105-*c* and the one or more other TRPs 105. Additionally, TRP 105-*c* may receive, from the one or more other TRPs 105, additional slot allocations identifying slots to be used by UE 115-*b* to provide HARQ-ACK feedback to the one or more other TRPs 105, where each slot identified in the slot allocation and the additional slot allocations is allocated for feedback transmissions by UE 115-*b* to only one TRP 105.

At 610, UE 115-*b* may receive a DCI message that includes an indication of a size of a HARQ-ACK codebook.

At 615, UE 115-*b* may determine a TRP-specific HARQ-ACK codebook for feedback transmissions to TRP 105-*c* of the multiple TRPs 105 based on the slot allocation. In some cases, UE 115-*b* may determine the TRP-specific HARQ-ACK codebook based on the DCI message received at 610. Additionally or alternatively, UE 115-*b* may determine the TRP-specific HARQ-ACK codebook based on at least one TRP-specific parameter that is semi-statically received. For example, the at least one TRP-specific parameter may include one or more of a number of cells supported by TRP 105-*c* for CA, a cell-specific uplink-downlink configuration associated with a cell of TRP 105-*c*, a per-BWP table of time-domain resource allocation for PDSCHs for TRP 105-*c*, a per-BWP set of parameters defining PDSCH-to-feedback timing for TRP 105-*c* (e.g., k1 values), or a per-BWP PDSCH repetition factor for TRP 105-*c*.

In some cases, UE 115-*b* may determine the TRP-specific HARQ-ACK codebook based on comparing the slot allocation with a cell-specific uplink-downlink configuration associated with a cell of TRP 105-*c*, where the feedback is transmitted to TRP 105-*c* using the corresponding slot only if the corresponding slot is identified as an uplink or flexible slot by the cell-specific uplink-downlink configuration. Additionally or alternatively, UE 115-*b* may determine the TRP-specific HARQ-ACK codebook based on comparing the slot allocation with a cell-specific uplink-downlink configuration associated with a cell of TRP 105-*c*, where the feedback is transmitted to TRP 105-*c* using the corresponding slot only if symbols of the corresponding slot allocated for feedback transmission are also allocated for uplink or flexible transmissions by the cell-specific uplink-downlink configuration.

At 620, UE 115-*b* may determine one or more TRP-specific uplink parameters for feedback transmissions to TRP 105-*c*. For example, UE 115-*b* may identify that QCL information is configured for PUCCH transmissions and then may identify TRP-specific QCL information for TRP 105-*c* for the corresponding slot. Additionally or alternatively, UE 115-*b* may identify TRP-specific power control parameters for transmissions to TRP 105-*c* for the corresponding slot. Additionally or alternatively, UE 115-*b* may identify TRP-specific TA parameters for transmissions to TRP 105-*c* for the corresponding slot.

At 625, UE 115-*b* may transmit feedback to TRP 105-*c* using a corresponding slot identified by the slot allocation and using the TRP-specific HARQ-ACK codebook and the one or more TRP-specific uplink parameters. In some cases, UE 115-*b* may transmit the feedback via at least one of a PUCCH or as piggybacked UCI via a PUSCH. Additionally, the feedback transmitted to TRP 105-*c* using the corresponding slot may include feedback information pertaining to only one PDSCH of multiple time-domain resource allocations having a same ending OFDM symbol.

In some cases, UE 115-*b* may identify only one PDSCH reception opportunity per slot per cell from TRP 105-*c* for time-domain resource allocations that overlap in time (e.g., may additionally have a same ending OFDM symbol). As such, UE 115-*b* may receive one PDSCH transmission from TRP 105-*c* associated with the identified PDSCH reception opportunity, where the feedback to be transmitted in the corresponding slot includes feedback information pertaining to the one PDSCH reception or the PDSCH transmission. Additionally or alternatively, UE 115-*b* may receive, from an additional TRP 105 of the multiple TRPs 105, an additional PDSCH, the additional PDSCH having time-domain resource allocation in a same CC that overlaps with the PDSCH received from TRP 105-*c*. Accordingly, UE 115-*b* may transmit the HARQ-ACK feedback to the additional TRP 105 in a slot allocated for the additional TRP 105.

Additionally, in some cases, UE 115-*b* may determine to transmit a set of HARQ-ACK feedback messages (e.g., multiple PUCCHs, PUSCHs, PUCCH repetitions, PUSCH repetitions, etc.) to the TRP of the set of TRPs. Subsequently, UE 115-*b* may identify a set of slots based on the slot allocation to transmit the set of HARQ-ACK feedback messages to the TRP and may transmit the set of HARQ-ACK feedback messages to the TRP in the identified set of slots. For example, the set of slots may include slots allocated only to the TRP of the set of TRPs, a number of consecutive slots allocated to any of the set of TRPs, a number of consecutive slots allocated to the TRP of the set of TRPs, or a combination thereof.

At 630, UE 115-*b* may transmit additional information to TRP 105-*c* using the corresponding slot identified by the slot allocation. In some cases, the additional information may be in the form of a PUSCH payload, an SR, or a CSI report. Additionally or alternatively, the feedback may be combined with the additional information on a single uplink channel.

Figure 7:
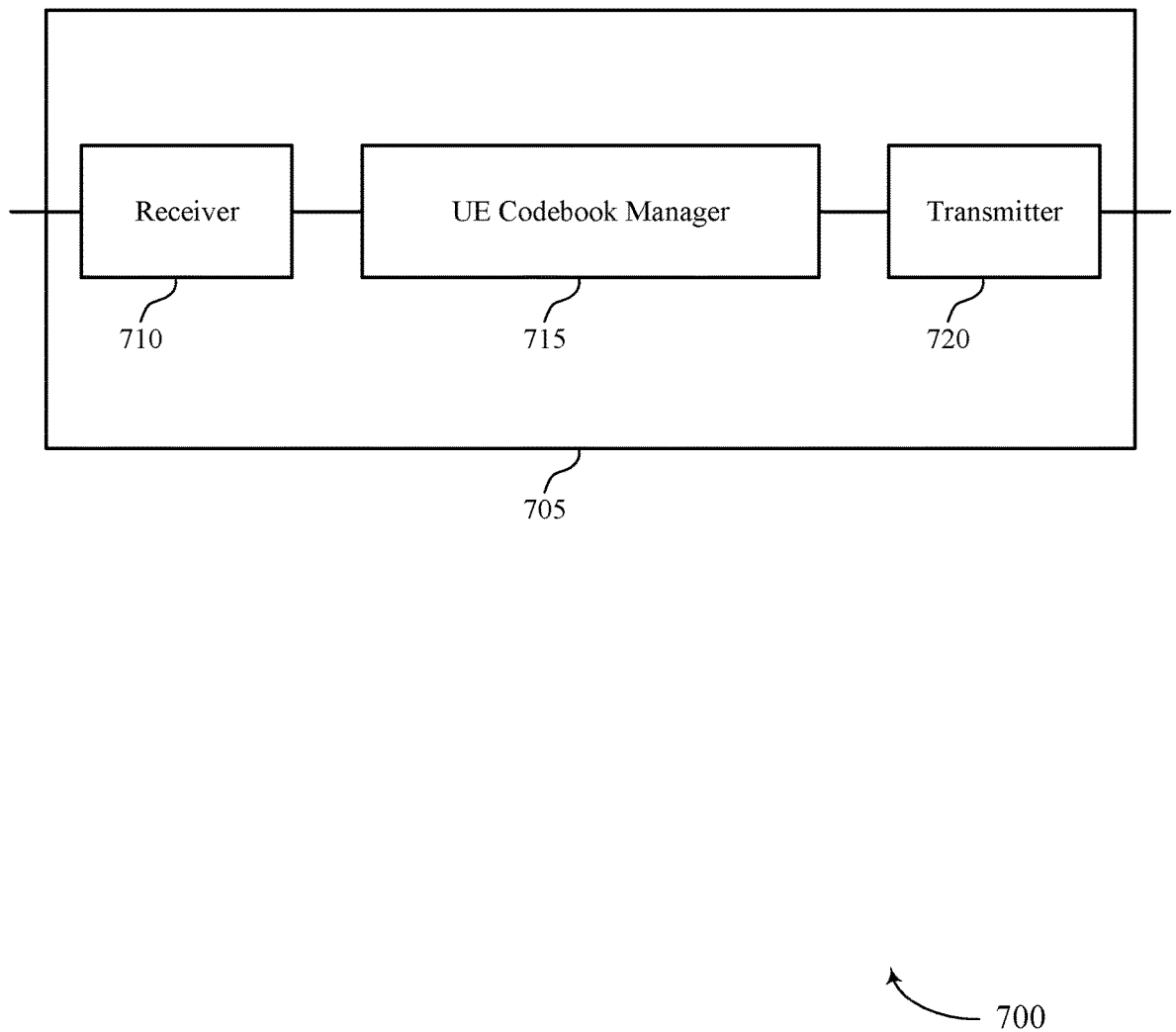
FIGS. 7 and 8 show block diagrams of devices that support ACK codebook design for multiple TRPs in accordance with aspects of the present disclosure.

FIG. 7 shows a block diagram 700 of a device 705 that supports ACK codebook design for multiple TRPs in accordance with aspects of the present disclosure. The device 705 may be an example of aspects of a UE 115 as described herein. The device 705 may include a receiver 710, a UE codebook manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to ACK codebook design for multiple TRPs, etc.). Information may be passed on to other components of the device 705. The receiver 710 may be an example of aspects of the transceiver 1020 described with reference to FIG. 10. The receiver 710 may utilize a single antenna or a set of antennas.

The UE codebook manager 715 may receive a slot allocation for the UE to provide HARQ-ACK feedback to a set of TRPs. In some cases, the UE codebook manager 715 may determine a TRP-specific HARQ-ACK codebook for feedback transmissions to a TRP of the set of TRPs based on the slot allocation. Additionally, the UE codebook manager 715 may determine one or more TRP-specific uplink parameters for feedback transmissions to the TRP. The UE codebook manager 715 may then transmit feedback to the TRP using a corresponding slot identified by the slot allocation and using the TRP-specific HARQ-ACK codebook and the one or more TRP-specific uplink parameters. The UE codebook manager 715 may be an example of aspects of the UE codebook manager 1010 described herein.

The UE codebook manager 715, or its sub-components, may be implemented in hardware, code (e.g., software or firmware) executed by a processor, or any combination thereof. If implemented in code executed by a processor, the functions of the UE codebook manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE codebook manager 715, or its sub-components, may be physically located at various positions, including being distributed such that portions of functions are implemented at different physical locations by one or more physical components. In some examples, the UE codebook manager 715, or its sub-components, may be a separate and distinct component in accordance with various aspects of the present disclosure. In some examples, the UE codebook manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the UE codebook manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The UE codebook manager 715 as described herein may be implemented to realize one or more potential advantages. One implementation may allow the device 705 to receive slot allocation for transmitting ACK feedback to a base station. The ACK feedback may include a corresponding slot identified by the slot allocation and a TRP-specific HARQ ACK codebook. This feedback may increase reliability and reduce latency during feedback transmissions.

Based on techniques for implementing feedback for grant-free uplink transmissions as described herein, a processor of a UE 115 (e.g., controlling the receiver 710, the transmitter 720, or the transceiver 1020 as described with reference to FIG. 10) may increase reliability and decrease signaling overhead in the communication of feedback because the UE 115 may avoid going through unnecessary configuration processes during retransmissions.

Figure 8:
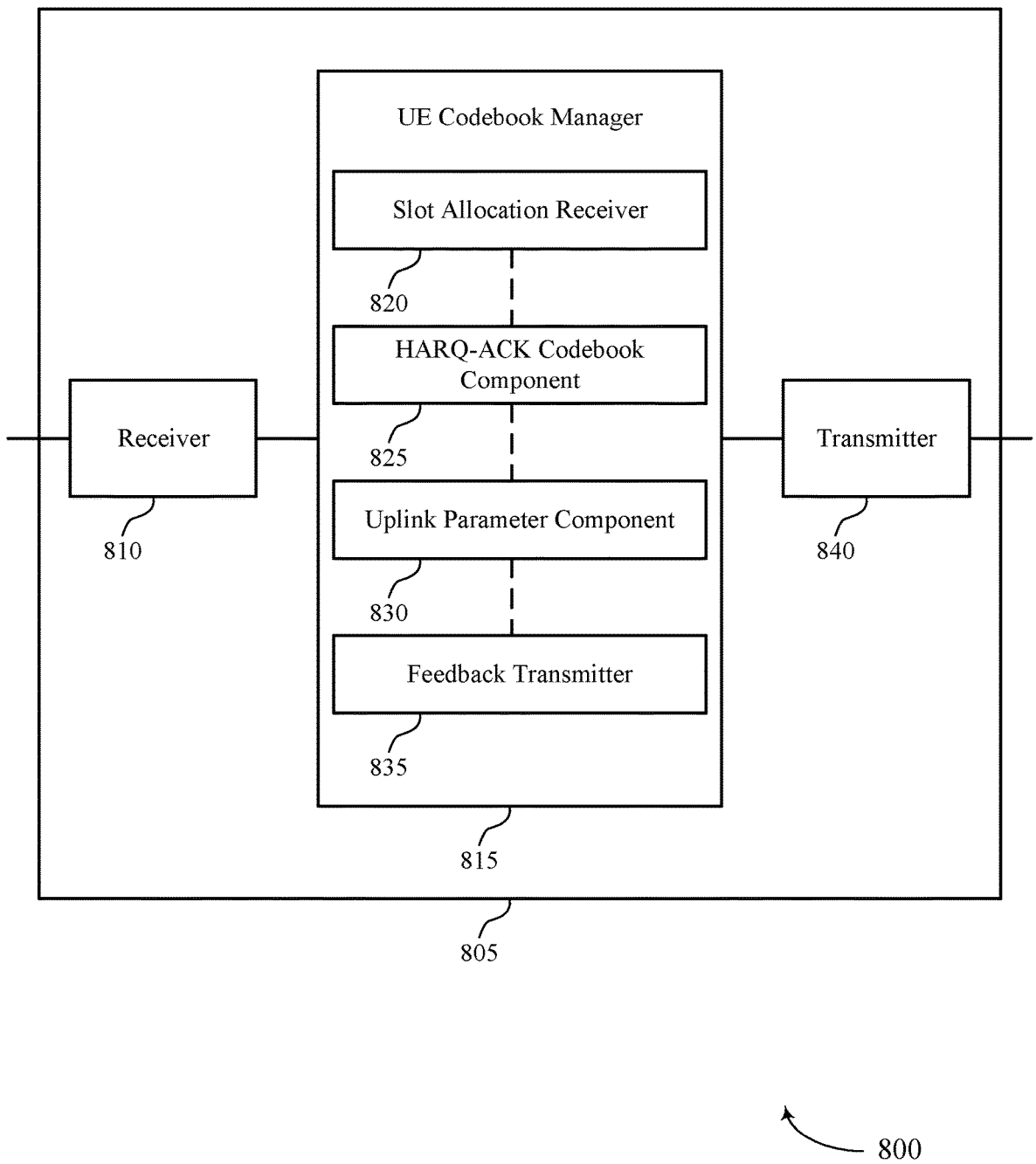

FIG. 8 shows a block diagram 800 of a device 805 that supports ACK codebook design for multiple TRPs in accordance with aspects of the present disclosure. The device 805 may be an example of aspects of a device 705, or a UE 115 as described herein. The device 805 may include a receiver 810, a UE codebook manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to ACK codebook design for multiple TRPs, etc.). Information may be passed on to other components of the device 805. The receiver 810 may be an example of aspects of the transceiver 1020 described with reference to FIG. 10. The receiver 810 may utilize a single antenna or a set of antennas.

The UE codebook manager 815 may be an example of aspects of the UE codebook manager 715 as described herein. The UE codebook manager 815 may include a slot allocation receiver 820, a HARQ-ACK codebook component 825, an uplink parameter component 830, and a feedback transmitter 835. The UE codebook manager 815 may be an example of aspects of the UE codebook manager 1010 described herein.

The slot allocation receiver 820 may receive a slot allocation for the UE to provide HARQ-ACK feedback to a set of TRPs.

The HARQ-ACK codebook component 825 may determine a TRP-specific HARQ-ACK codebook for feedback transmissions to a TRP of the set of TRPs based on the slot allocation.

The uplink parameter component 830 may determine one or more TRP-specific uplink parameters for feedback transmissions to the TRP.

The feedback transmitter 835 may transmit feedback to the TRP using a corresponding slot identified by the slot allocation and using the TRP-specific HARQ-ACK codebook and the one or more TRP-specific uplink parameters.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

In some examples, the UE codebook manager 815 may be implemented as an integrated circuit or chipset for a mobile device modem, and the receiver 810 and transmitter 840 may be implemented as analog components (e.g., amplifiers, filters, antennas) coupled with the mobile device modem to enable wireless transmission and reception over one or more bands.

The UE codebook manager 815 as described herein may be implemented to realize one or more potential advantages. One implementation may allow the device 805 to receive slot allocation for transmitting ACK feedback to a base station. The ACK feedback may include a corresponding slot identified by the slot allocation and a TRP-specific HARQ ACK codebook. This feedback may increase reliability and reduce latency during feedback transmissions.

Based on techniques for implementing feedback for grant-free uplink transmissions as described herein, a processor of a UE 115 (e.g., controlling the receiver 710, the transmitter 840, or the transceiver 1020 as described with reference to FIG. 10) may increase reliability and decrease signaling overhead in the communication of feedback because the UE 115 may avoid going through unnecessary configuration processes during retransmissions.

Figure 9:
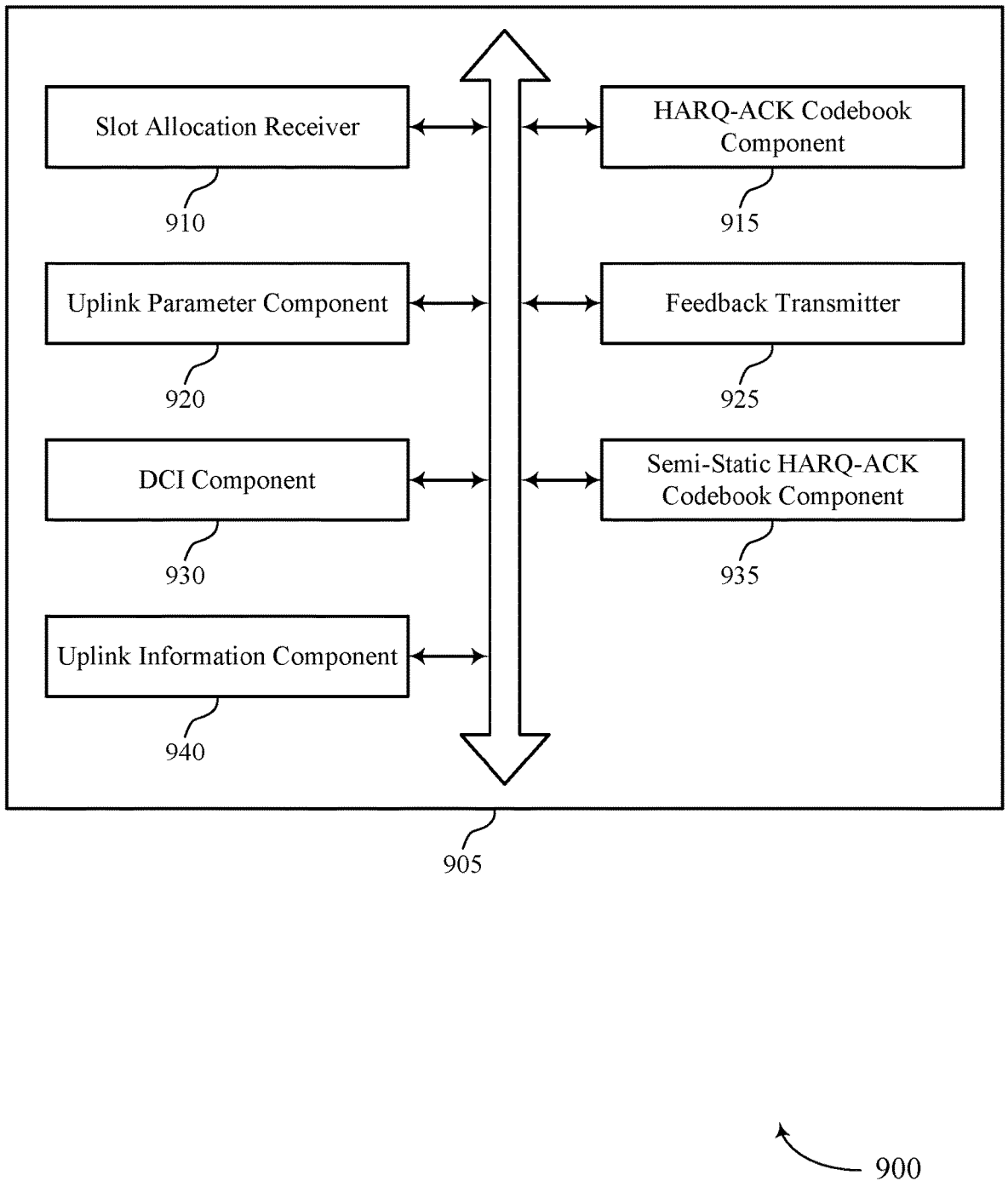
FIG. 9 shows a block diagram of a UE codebook manager that supports ACK codebook design for multiple TRPs in accordance with aspects of the present disclosure.

FIG. 9 shows a block diagram 900 of a UE codebook manager 905 that supports ACK codebook design for multiple TRPs in accordance with aspects of the present disclosure. The UE codebook manager 905 may be an example of aspects of a UE codebook manager 715, a UE codebook manager 815, or a UE codebook manager 1010 described herein. The UE codebook manager 905 may include a slot allocation receiver 910, a HARQ-ACK codebook component 915, an uplink parameter component 920, a feedback transmitter 925, a DCI component 930, a semi-static HARQ-ACK codebook component 935, and an uplink information component 940. Each of these modules may communicate, directly or indirectly, with one another (e.g., via one or more buses).

The slot allocation receiver 910 may receive a slot allocation for the UE to provide HARQ-ACK feedback to a set of TRPs. In some examples, the slot allocation receiver 910 may receive an allocation of slots to be used by the UE for providing HARQ-ACK feedback to different TRPs of the set of TRPs, where each slot identified in the slot allocation is allocated for feedback transmissions by the UE to only one TRP of the set of TRPs. Additionally or alternatively, the slot allocation receiver 910 may receive an allocation of slots to be used by the UE for providing HARQ-ACK feedback to different TRPs of the set of TRPs, where the slots are allocated asymmetrically between the set of TRPs. In some examples, the slot allocation receiver 910 may receive the slot allocation via RRC signaling.

The HARQ-ACK codebook component 915 may determine a TRP-specific HARQ-ACK codebook for feedback transmissions to a TRP of the set of TRPs based on the slot allocation. In some examples, the HARQ-ACK codebook component 915 may compare the slot allocation with a cell-specific uplink-downlink configuration associated with a cell of the TRP, where the feedback is transmitted to the TRP using the corresponding slot only if the corresponding slot is identified as an uplink slot by the cell-specific uplink-downlink configuration. Additionally or alternatively, the HARQ-ACK codebook component 915 may compare the slot allocation with a cell-specific uplink-downlink configuration associated with a cell of the TRP, where the feedback is transmitted to the TRP using the corresponding slot only if symbols of the corresponding slot allocated for feedback transmission are also allocated for uplink transmissions by the cell-specific uplink-downlink configuration.

The uplink parameter component 920 may determine one or more TRP-specific uplink parameters for feedback transmissions to the TRP. In some examples, the uplink parameter component 920 may identify that QCL information is configured for PUCCH transmissions and may identify TRP-specific QCL information for the TRP for the corresponding slot. Additionally or alternatively, the uplink parameter component 920 may identify TRP-specific power control parameters for transmissions to the TRP for the corresponding slot. In some cases, the TRP-specific power control parameters may include at least one of an open-loop power control parameter and a closed-loop power control parameter. Additionally or alternatively, the uplink parameter component 920 may identify TRP-specific TA parameters for transmissions to the TRP for the corresponding slot.

The feedback transmitter 925 may transmit feedback to the TRP using a corresponding slot identified by the slot allocation and using the TRP-specific HARQ-ACK codebook and the one or more TRP-specific uplink parameters. In some examples, the feedback transmitter 925 may transmit the feedback via at least one of a PUCCH or as piggybacked UCI via a PUSCH. Additionally or alternatively, the feedback transmitted to the TRP using the corresponding slot may include feedback information pertaining to only one PDSCH of multiple time-domain resource allocations having a same ending OFDM symbol.

In some cases, the feedback transmitter 925 may determine to transmit a set of HARQ-ACK feedback messages to the TRP of the set of TRPs. Subsequently, the feedback transmitter 925 may identify a set of slots based on the slot allocation to transmit the set of HARQ-ACK feedback messages to the TRP and may transmit the set of HARQ-ACK feedback messages to the TRP in the identified set of slots. Additionally, the set of slots may include slots allocated only to the TRP of the set of TRPs, a number of consecutive slots allocated to any of the set of TRPs, a number of consecutive slots allocated to the TRP of the set of TRPs, or a combination thereof.

The DCI component 930 may receive a DCI message that includes an indication of a size of the HARQ-ACK codebook.

The semi-static HARQ-ACK codebook component 935 may determine the TRP-specific HARQ-ACK codebook based on at least one TRP-specific parameter that is semi-statically received. In some cases, the at least one TRP-specific parameter may include one or more of a number of cells supported by the TRP for CA, a cell-specific uplink-downlink configuration associated with a cell of the TRP, a per-BWP table of time-domain resource allocation for PDSCHs for the TRP, a per-BWP set of parameters defining PDSCH to feedback timing for the TRP, or a per-BWP PDSCH repetition factor for the TRP.

In some examples, the semi-static HARQ-ACK codebook component 935 may identify only one PDSCH reception opportunity per slot per cell from the TRP for time-domain resource allocations that have a same ending OFDM symbol. Accordingly, the semi-static HARQ-ACK codebook component 935 may receive one PDSCH transmission from the TRP associated with the identified PDSCH reception opportunity, where the feedback to be transmitted in the corresponding slot includes feedback information pertaining to the one PDSCH reception or the PDSCH transmission.

Additionally or alternatively, the semi-static HARQ-ACK codebook component 935 may receive, from an additional TRP of the set of TRPs, an additional PDSCH, the additional PDSCH having a same ending OFDM symbol in a same CC as the PDSCH received from the TRP. Accordingly, the semi-static HARQ-ACK codebook component 935 may transmit the HARQ-ACK feedback to the additional TRP in a slot allocated for the additional TRP.

The uplink information component 940 may transmit additional information to the TRP using the corresponding slot identified by the slot allocation. In some cases, the additional information may be in the form of a PUSCH payload, an SR, or a CSI report. Additionally, the feedback may be combined with the additional information on a single uplink channel.

Figure 10:
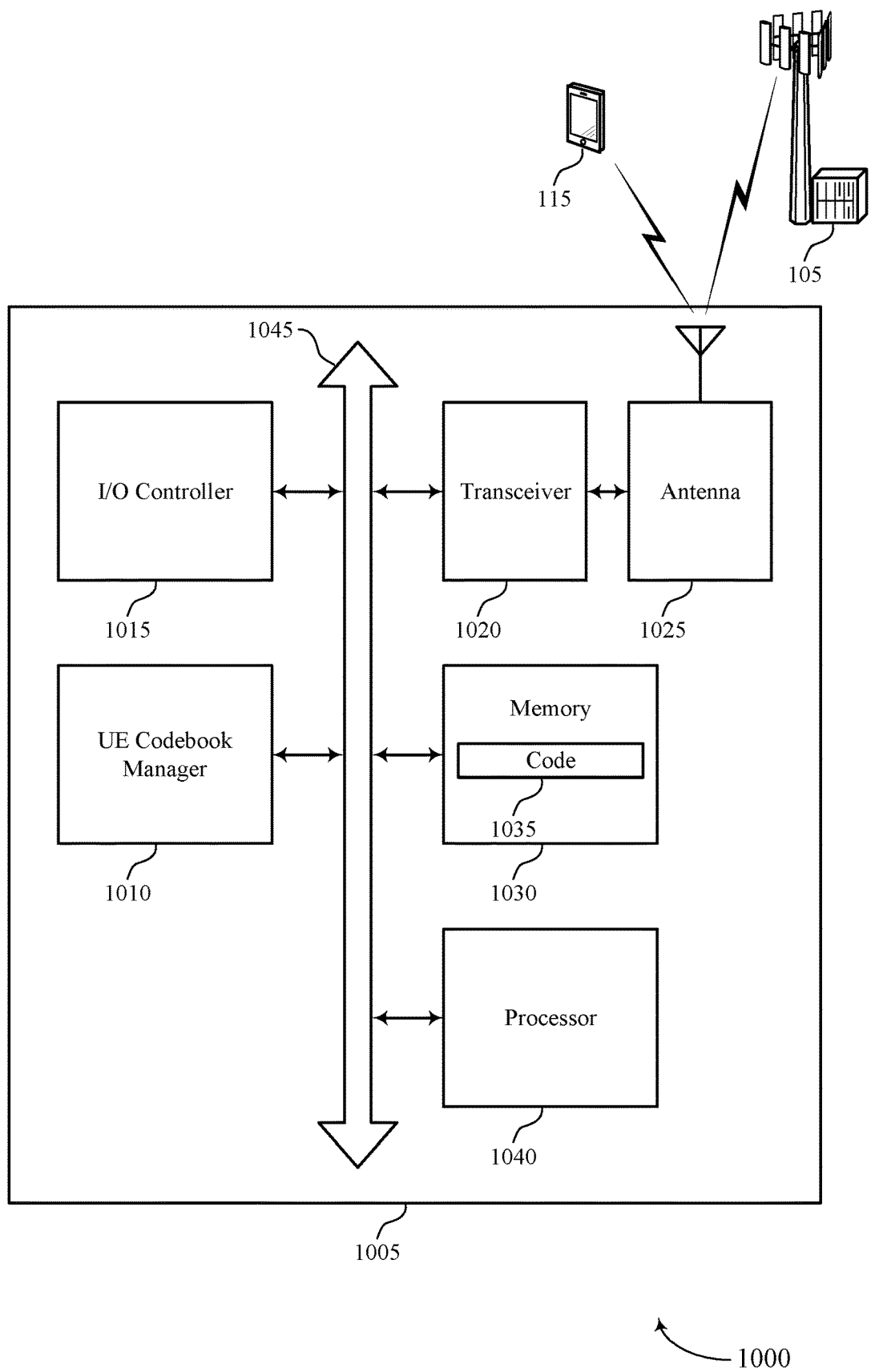
FIG. 10 shows a diagram of a system including a device that supports ACK codebook design for multiple TRPs in accordance with aspects of the present disclosure.

FIG. 10 shows a diagram of a system 1000 including a device 1005 that supports ACK codebook design for multiple TRPs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE codebook manager 1010, an I/O controller 1015, a transceiver 1020, an antenna 1025, memory 1030, and a processor 1040. These components may be in electronic communication via one or more buses (e.g., bus 1045).

The UE codebook manager 1010 may receive a slot allocation for the UE to provide HARQ-ACK feedback to a set of TRPs. In some cases, the UE codebook manager 1010 may determine a TRP-specific HARQ-ACK codebook for feedback transmissions to a TRP of the set of TRPs based on the slot allocation. Additionally, the UE codebook manager 1010 may determine one or more TRP-specific uplink parameters for feedback transmissions to the TRP. The UE codebook manager 1010 may then transmit feedback to the TRP using a corresponding slot identified by the slot allocation and using the TRP-specific HARQ-ACK codebook and the one or more TRP-specific uplink parameters.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting ACK codebook design for multiple TRPs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
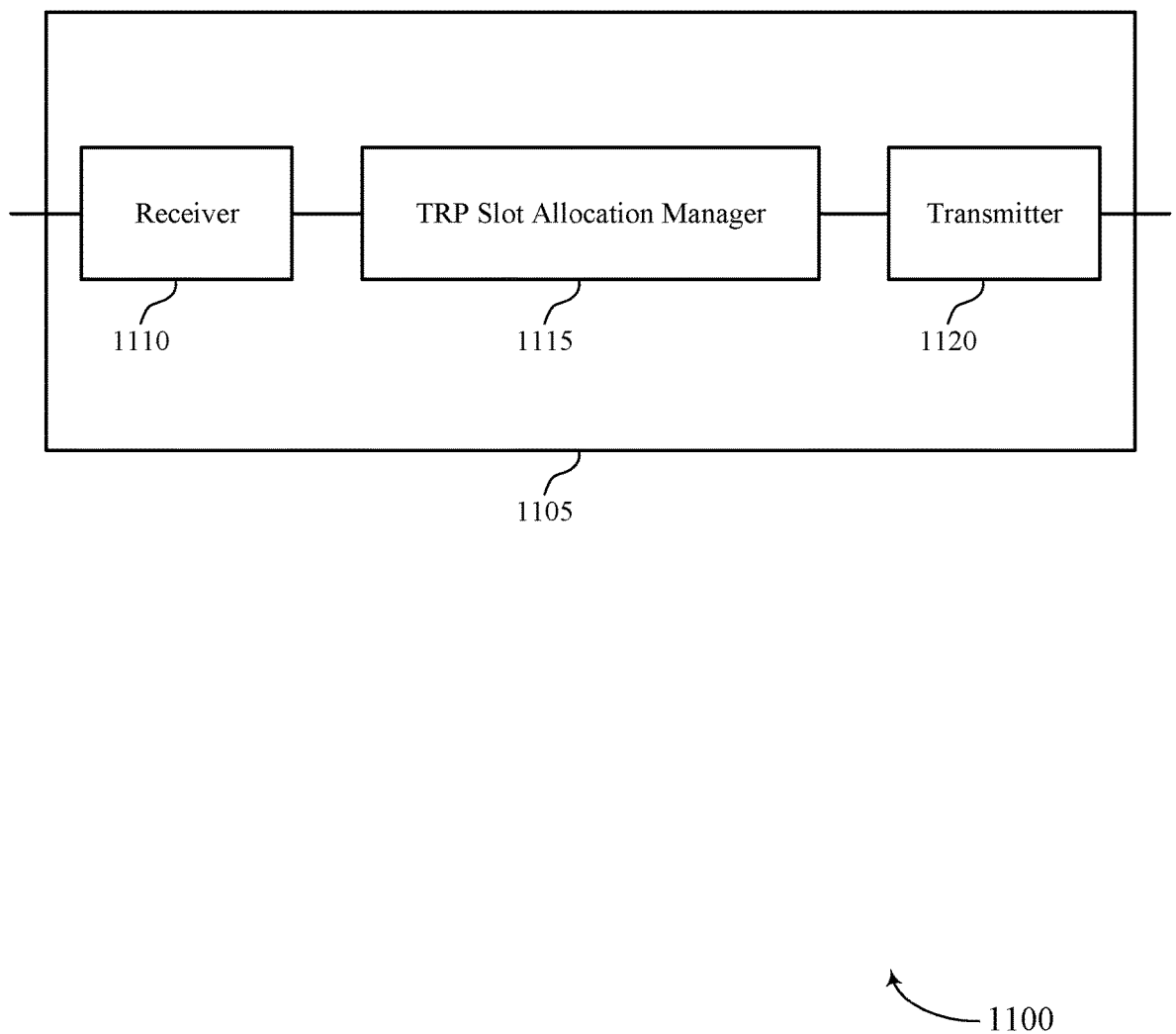
FIGS. 11 and 12 show block diagrams of devices that support ACK codebook design for multiple TRPs in accordance with aspects of the present disclosure.

FIG. 11 shows a block diagram 1100 of a device 1105 that supports ACK codebook design for multiple TRPs in accordance with aspects of the present disclosure. The device 1105 may be an example of aspects of a base station 105 as described herein. The device 1105 may include a receiver 1110, a TRP slot allocation manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to ACK codebook design for multiple TRPs, etc.). Information may be passed on to other components of the device 1105. The receiver 1110 may be an example of aspects of the transceiver 1420 described with reference to FIG. 14. The receiver 1110 may utilize a single antenna or a set of antennas.

The TRP slot allocation manager 1115 may identify, at the TRP, a slot allocation of at least one slot to be used by a UE to provide HARQ-ACK feedback to the TRP. The TRP slot allocation manager 1115 may then transmit a downlink message to the UE. Additionally, the TRP slot allocation manager 1115 may transmit an indication that the UE is to provide HARQ-ACK feedback using the at least one slot identified by the slot allocation. In some cases, the TRP slot allocation manager 1115 may then receive, from the UE and on the at least one slot identified by the slot allocation, HARQ-ACK feedback pertaining to the downlink message. The TRP slot allocation manager 1115 may be an example of aspects of the TRP slot allocation manager 1410 described herein.

The TRP slot allocation manager 1115, or its sub-components, may be implemented in hardware, code (e.g., software or firmware) executed by a processor, or any combination thereof. If implemented in code executed by a processor, the functions of the TRP slot allocation manager 1115, or its sub-components may be executed by a general-purpose processor, a DSP, an ASIC, an FPGA or other PLD, discrete gate or transistor logic, discrete hardware components, or any combination thereof designed to perform the functions described in the present disclosure.

The TRP slot allocation manager 1115, or its sub-components, may be physically located at various positions, including being distributed such that portions of functions are implemented at different physical locations by one or more physical components. In some examples, the TRP slot allocation manager 1115, or its sub-components, may be a separate and distinct component in accordance with various aspects of the present disclosure. In some examples, the TRP slot allocation manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
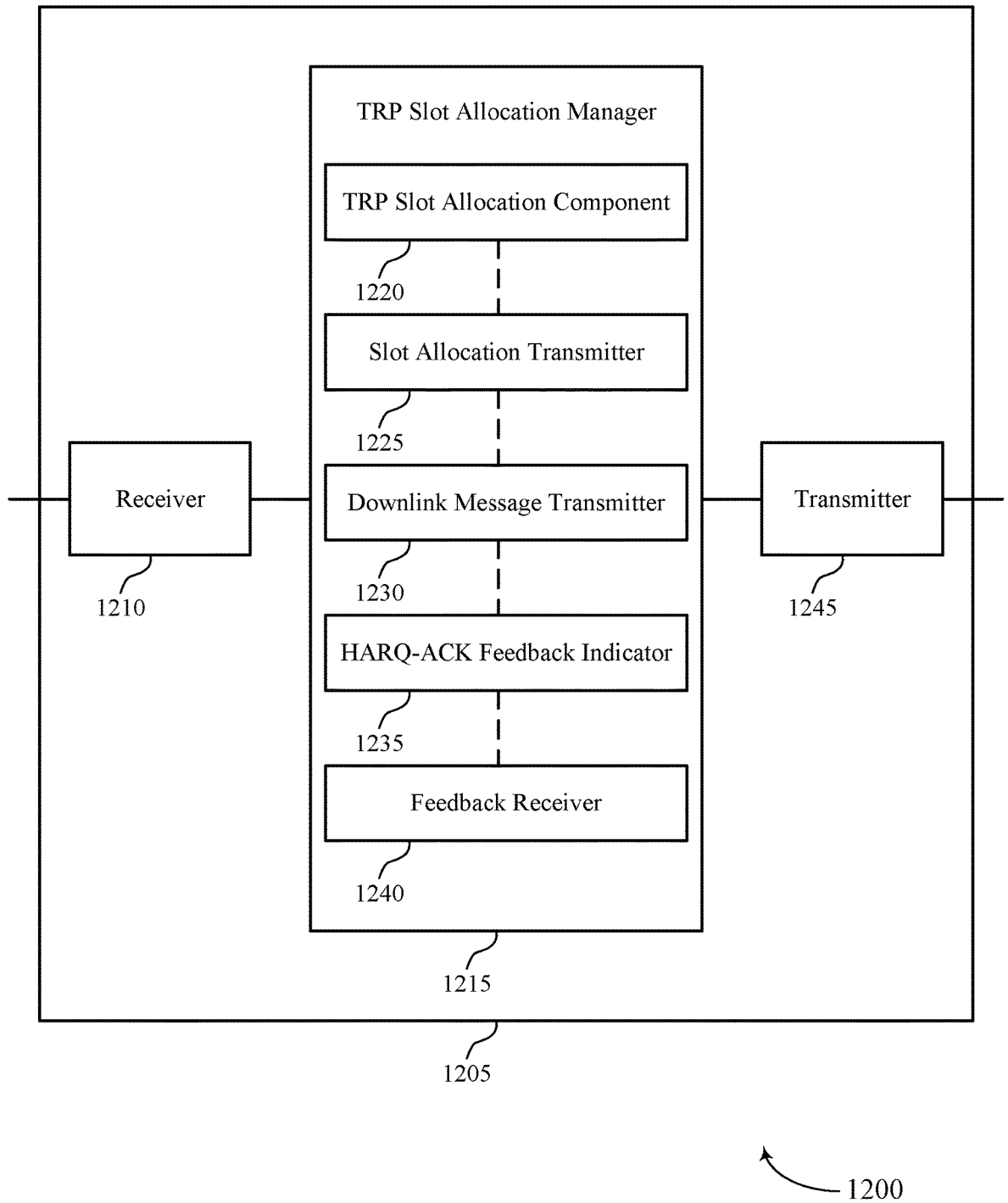

FIG. 12 shows a block diagram 1200 of a device 1205 that supports ACK codebook design for multiple TRPs in accordance with aspects of the present disclosure. The device 1205 may be an example of aspects of a device 1105, or a base station 105 as described herein. The device 1205 may include a receiver 1210, a TRP slot allocation manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to ACK codebook design for multiple TRPs, etc.). Information may be passed on to other components of the device 1205. The receiver 1210 may be an example of aspects of the transceiver 1420 described with reference to FIG. 14. The receiver 1210 may utilize a single antenna or a set of antennas.

The TRP slot allocation manager 1215 may be an example of aspects of the TRP slot allocation manager 1115 as described herein. The TRP slot allocation manager 1215 may include a TRP slot allocation component 1220, a slot allocation transmitter 1225, a downlink message transmitter 1230, a HARQ-ACK feedback indicator 1235, and a feedback receiver 1240. The TRP slot allocation manager 1215 may be an example of aspects of the TRP slot allocation manager 1410 described herein.

The TRP slot allocation component 1220 may identify, at the TRP, a slot allocation of at least one slot to be used by a UE to provide HARQ-ACK feedback to the TRP.

The slot allocation transmitter 1225 may transmit the slot allocation to one or more other TRPs in communication with the UE to facilitate slot allocation coordination between the TRP and the one or more other TRPs.

The downlink message transmitter 1230 may transmit a downlink message to the UE.

The HARQ-ACK feedback indicator 1235 may transmit an indication that the UE is to provide HARQ-ACK feedback using the at least one slot identified by the slot allocation.

The feedback receiver 1240 may receive, from the UE and on the at least one slot identified by the slot allocation, HARQ-ACK feedback pertaining to the downlink message.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
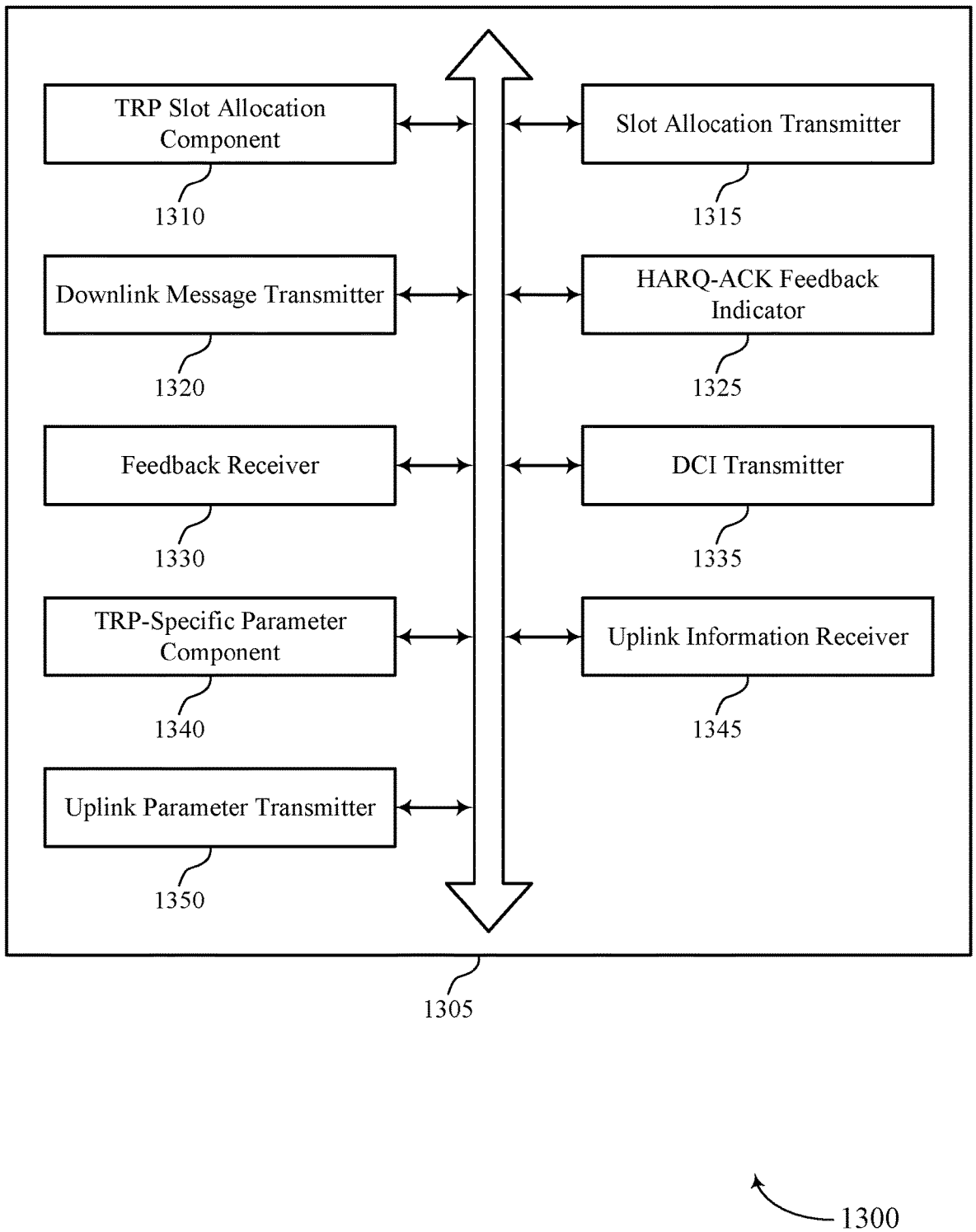
FIG. 13 shows a block diagram of a TRP slot allocation manager that supports ACK codebook design for multiple TRPs in accordance with aspects of the present disclosure.

FIG. 13 shows a block diagram 1300 of a TRP slot allocation manager 1305 that supports ACK codebook design for multiple TRPs in accordance with aspects of the present disclosure. The TRP slot allocation manager 1305 may be an example of aspects of a TRP slot allocation manager 1115, a TRP slot allocation manager 1215, or a TRP slot allocation manager 1410 described herein. The TRP slot allocation manager 1305 may include a TRP slot allocation component 1310, a slot allocation transmitter 1315, a downlink message transmitter 1320, a HARQ-ACK feedback indicator 1325, a feedback receiver 1330, a DCI transmitter 1335, a TRP-specific parameter component 1340, an uplink information receiver 1345, and an uplink parameter transmitter 1350. Each of these modules may communicate, directly or indirectly, with one another (e.g., via one or more buses).

The TRP slot allocation component 1310 may identify, at the TRP, a slot allocation of at least one slot to be used by a UE to provide HARQ-ACK feedback to the TRP. In some examples, the TRP slot allocation component 1310 may receive, from the one or more other TRPs, additional slot allocations identifying slots to be used by the UE to provide HARQ-ACK feedback to the one or more other TRPs, where each slot identified in the slot allocation and the additional slot allocations is allocated for feedback transmissions by the UE to only one TRP. In some cases, the slots may be allocated asymmetrically between the TRP and the additional TRPs.

The slot allocation transmitter 1315 may transmit the slot allocation to one or more other TRPs in communication with the UE to facilitate slot allocation coordination between the TRP and the one or more other TRPs. In some examples, the slot allocation transmitter 1315 may transmit the slot allocation via RRC signaling.

The downlink message transmitter 1320 may transmit a downlink message to the UE. In some examples, the downlink message transmitter 1320 may transmit only one PDSCH with a time-domain resource allocation having a same ending OFDM symbol per slot from the TRP.

The HARQ-ACK feedback indicator 1325 may transmit an indication that the UE is to provide HARQ-ACK feedback using the at least one slot identified by the slot allocation.

The feedback receiver 1330 may receive, from the UE and on the at least one slot identified by the slot allocation, HARQ-ACK feedback pertaining to the downlink message. In some cases, the HARQ-ACK feedback received from the UE in the at least one slot may include feedback information pertaining to only one PDSCH of multiple time-domain resource allocations having a same ending OFDM symbol.

In some examples, the feedback receiver 330 may receive the HARQ-ACK feedback on the at least one slot identified by the slot allocation only if the at least one slot is identified as an uplink slot by a cell-specific uplink-downlink configuration associated with the TRP. Additionally or alternatively, the feedback receiver 1330 may receive the HARQ-ACK feedback on symbols of the at least one slot identified by the slot allocation only if the symbols of the at least one slot are allocated for uplink transmissions by a cell-specific uplink-downlink configuration associated with the TRP. In some cases, the feedback receiver 1330 may receive the HARQ-ACK feedback via at least one of a PUCCH or as piggy-backed UCI via a PUSCH.

The DCI transmitter 1335 may transmit the indication via a DCI message. In some examples, the DCI transmitter 335 may transmit a DCI message that includes an indication of a size of a HARQ-ACK codebook to be used by the UE in providing feedback to the TRP.

The TRP-specific parameter component 1340 may transmit at least one semi-static TRP-specific parameter to the UE. In some cases, the at least one TRP-specific parameter may include one or more of a number of cells supported by the TRP for CA, a cell-specific uplink-downlink configuration associated with a cell of the TRP, a per-BWP table of time-domain resource allocation for PDSCHs for the TRP, a per-BWP set of parameters defining PDSCH to feedback timing for the TRP, or a per-BWP PDSCH repetition factor for the TRP.

The uplink information receiver 1345 may receive additional information from the UE using the at least one slot identified by the slot allocation. In some cases, the additional information may be in the form of a PUSCH payload, an SR, or a CSI report. Additionally the HARQ-ACK feedback is combined with the additional information on a single uplink channel.

The uplink parameter transmitter 1350 may transmit TRP-specific QCL information to the UE. Additionally or alternatively, the uplink parameter transmitter 1350 may transmit TRP-specific power control parameters to the UE for transmissions to the TRP during the at least one slot. Additionally or alternatively, the uplink parameter transmitter 1350 may transmit TRP-specific TA parameters to the UE for transmissions to the TRP during the at least one slot.

Figure 14:
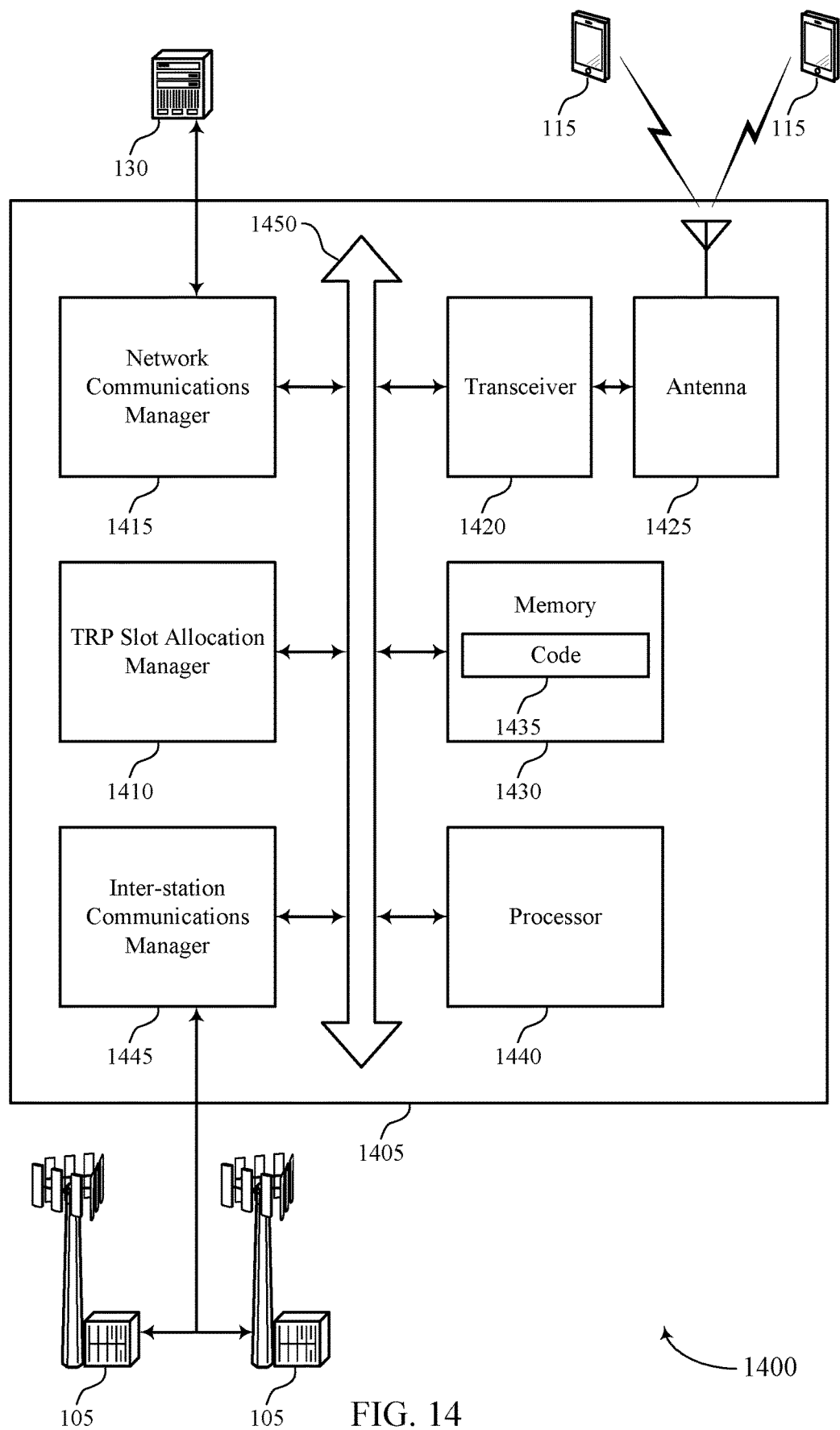
FIG. 14 shows a diagram of a system including a device that supports ACK codebook design for multiple TRPs in accordance with aspects of the present disclosure.

FIG. 14 shows a diagram of a system 1400 including a device 1405 that supports ACK codebook design for multiple TRPs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a TRP slot allocation manager 1410, a network communications manager 1415, a transceiver 1420, an antenna 1425, memory 1430, a processor 1440, and an inter-station communications manager 1445. These components may be in electronic communication via one or more buses (e.g., bus 1450).

The TRP slot allocation manager 1410 may identify, at the TRP, a slot allocation of at least one slot to be used by a UE to provide HARQ-ACK feedback to the TRP. The TRP slot allocation manager 1410 may then transmit a downlink message to the UE. Additionally, the TRP slot allocation manager 1410 may transmit an indication that the UE is to provide HARQ-ACK feedback using the at least one slot identified by the slot allocation. In some cases, The TRP slot allocation manager 1410 may receive, from the UE and on the at least one slot identified by the slot allocation, HARQ-ACK feedback pertaining to the downlink message.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting ACK codebook design for multiple TRPs).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
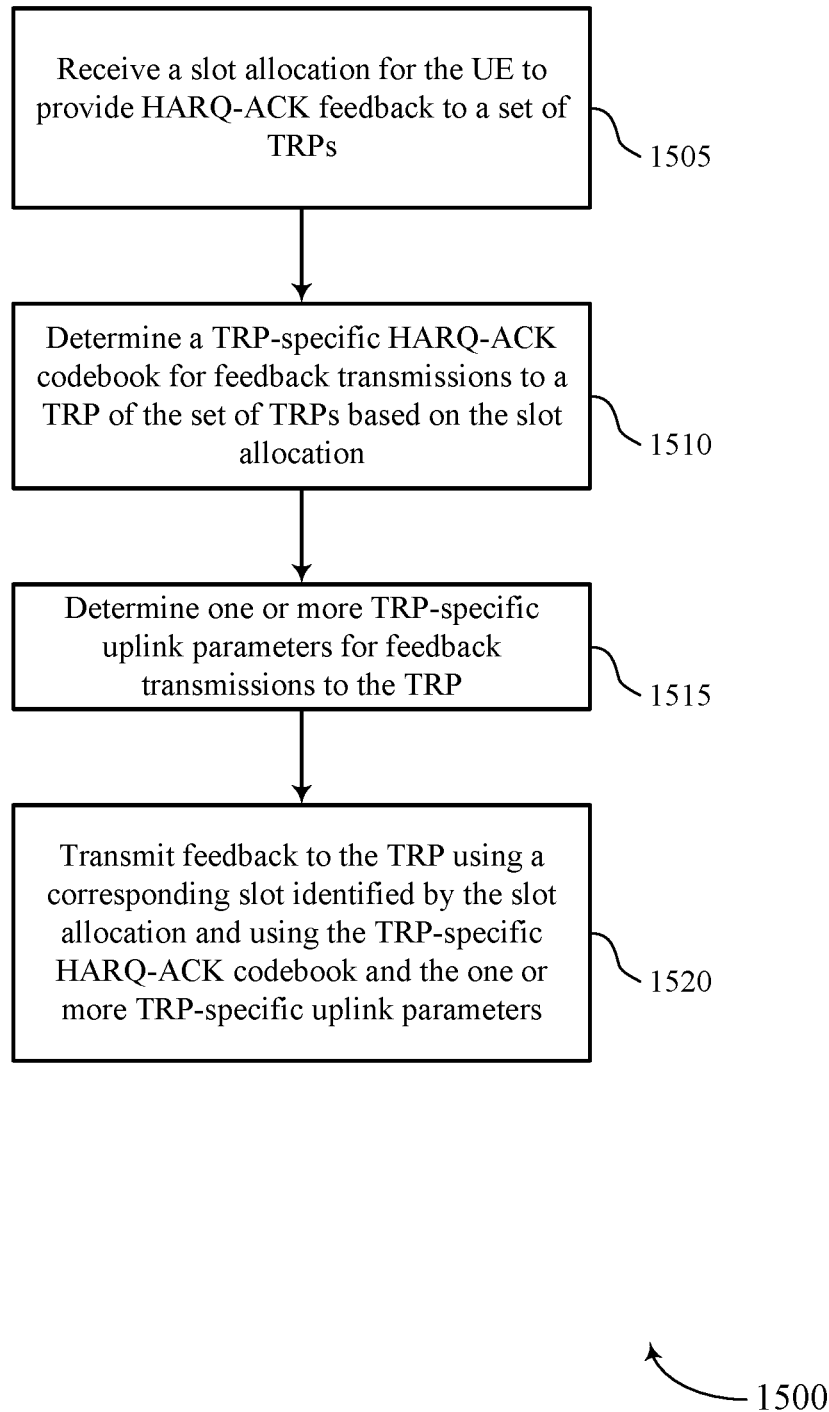
FIGS. 15 through 20 show flowcharts illustrating methods that support ACK codebook design for multiple TRPs in accordance with aspects of the present disclosure.

FIG. 15 shows a flowchart illustrating a method 1500 that supports ACK codebook design for multiple TRPs in accordance with aspects of the present disclosure. The operations of method 1500 may be implemented by a UE 115 or its components as described herein. For example, the operations of method 1500 may be performed by a UE codebook manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive a slot allocation for the UE to provide HARQ-ACK feedback to a set of TRPs. The operations of 1505 may be performed according to the methods described herein. In some examples, aspects of the operations of 1505 may be performed by a slot allocation receiver as described with reference to FIGS. 7 through 10.

At 1510, the UE may determine a TRP-specific HARQ-ACK codebook for feedback transmissions to a TRP of the set of TRPs based on the slot allocation. The operations of 1510 may be performed according to the methods described herein. In some examples, aspects of the operations of 1510 may be performed by a HARQ-ACK codebook component as described with reference to FIGS. 7 through 10.

At 1515, the UE may determine one or more TRP-specific uplink parameters for feedback transmissions to the TRP. The operations of 1515 may be performed according to the methods described herein. In some examples, aspects of the operations of 1515 may be performed by an uplink parameter component as described with reference to FIGS. 7 through 10.

At 1520, the UE may transmit feedback to the TRP using a corresponding slot identified by the slot allocation and using the TRP-specific HARQ-ACK codebook and the one or more TRP-specific uplink parameters. The operations of 1520 may be performed according to the methods described herein. In some examples, aspects of the operations of 1520 may be performed by a feedback transmitter as described with reference to FIGS. 7 through 10.

Figure 16:
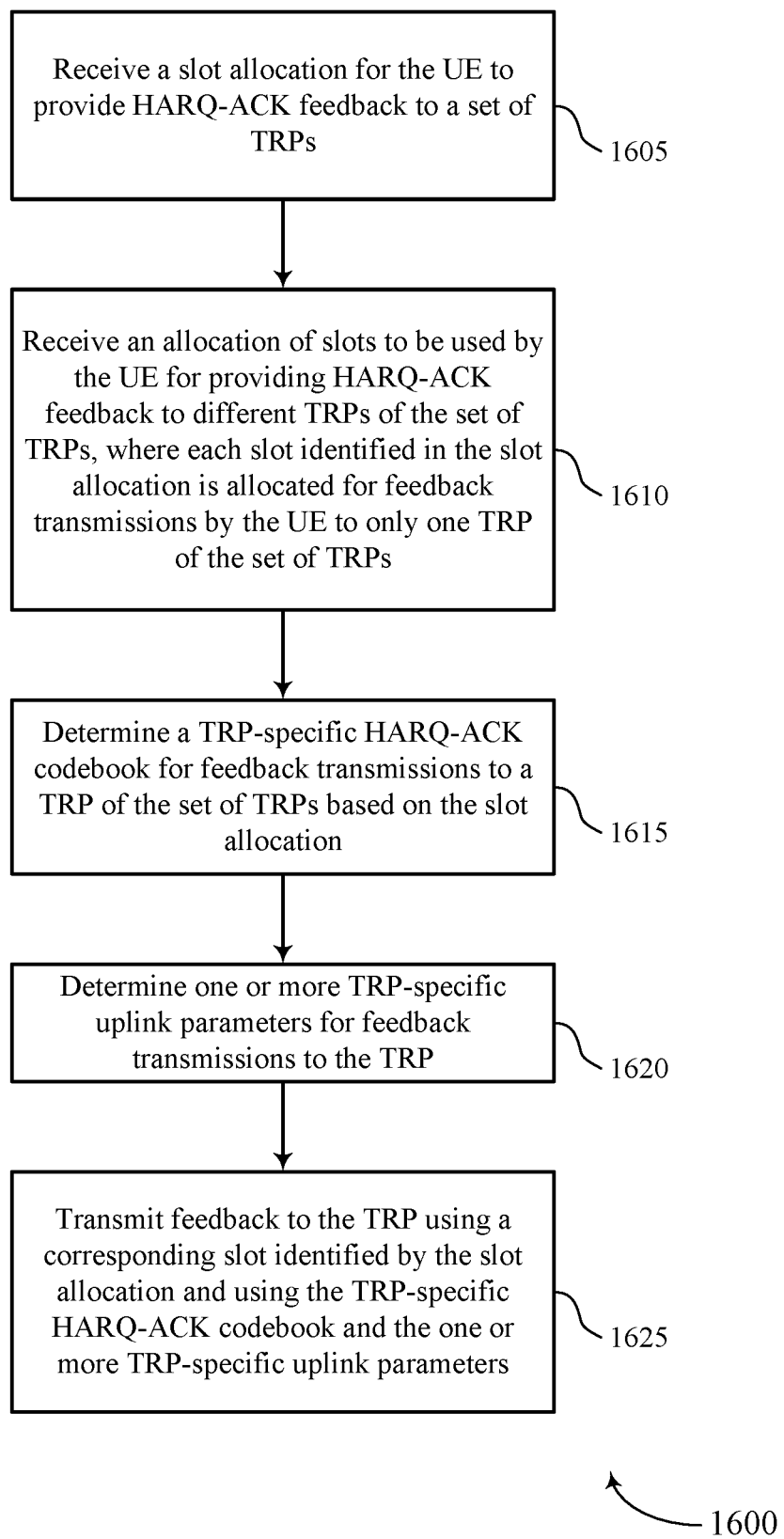

FIG. 16 shows a flowchart illustrating a method 1600 that supports ACK codebook design for multiple TRPs in accordance with aspects of the present disclosure. The operations of method 1600 may be implemented by a UE 115 or its components as described herein. For example, the operations of method 1600 may be performed by a UE codebook manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive a slot allocation for the UE to provide HARQ-ACK feedback to a set of TRPs. The operations of 1605 may be performed according to the methods described herein. In some examples, aspects of the operations of 1605 may be performed by a slot allocation receiver as described with reference to FIGS. 7 through 10.

At 1610, the UE may receive an allocation of slots to be used by the UE for providing HARQ-ACK feedback to different TRPs of the set of TRPs, where each slot identified in the slot allocation is allocated for feedback transmissions by the UE to only one TRP of the set of TRPs. The operations of 1610 may be performed according to the methods described herein. In some examples, aspects of the operations of 1610 may be performed by a slot allocation receiver as described with reference to FIGS. 7 through 10.

At 1615, the UE may determine a TRP-specific HARQ-ACK codebook for feedback transmissions to a TRP of the set of TRPs based on the slot allocation. The operations of 1615 may be performed according to the methods described herein. In some examples, aspects of the operations of 1615 may be performed by a HARQ-ACK codebook component as described with reference to FIGS. 7 through 10.

At 1620, the UE may determine one or more TRP-specific uplink parameters for feedback transmissions to the TRP. The operations of 1620 may be performed according to the methods described herein. In some examples, aspects of the operations of 1620 may be performed by an uplink parameter component as described with reference to FIGS. 7 through 10.

At 1625, the UE may transmit feedback to the TRP using a corresponding slot identified by the slot allocation and using the TRP-specific HARQ-ACK codebook and the one or more TRP-specific uplink parameters. The operations of 1625 may be performed according to the methods described herein. In some examples, aspects of the operations of 1625 may be performed by a feedback transmitter as described with reference to FIGS. 7 through 10.

Figure 17:
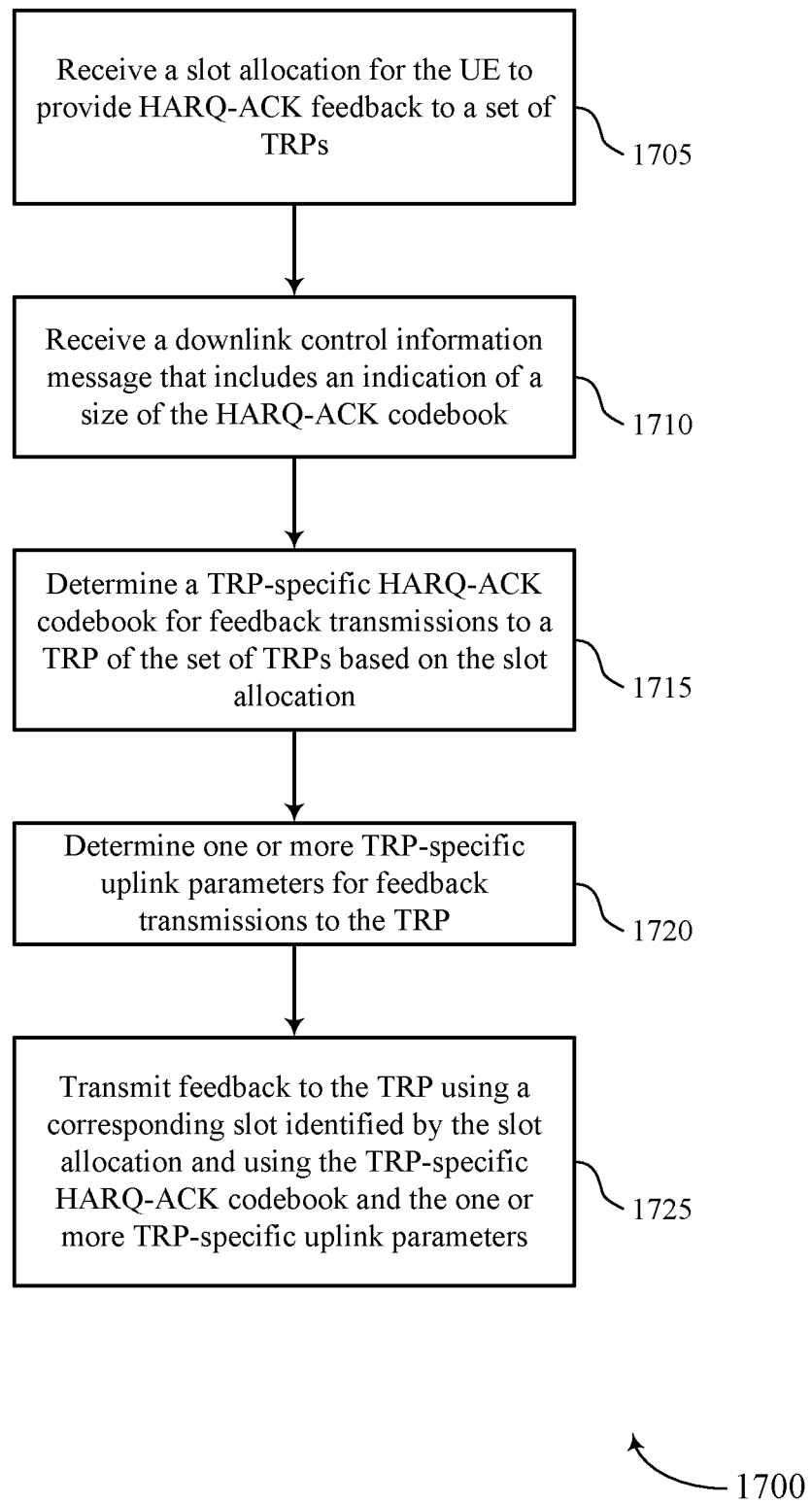

FIG. 17 shows a flowchart illustrating a method 1700 that supports ACK codebook design for multiple TRPs in accordance with aspects of the present disclosure. The operations of method 1700 may be implemented by a UE 115 or its components as described herein. For example, the operations of method 1700 may be performed by a UE codebook manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive a slot allocation for the UE to provide HARQ-ACK feedback to a set of TRPs. The operations of 1705 may be performed according to the methods described herein. In some examples, aspects of the operations of 1705 may be performed by a slot allocation receiver as described with reference to FIGS. 7 through 10.

At 1710, the UE may receive a DCI message that includes an indication of a size of the HARQ-ACK codebook. The operations of 1710 may be performed according to the methods described herein. In some examples, aspects of the operations of 1710 may be performed by a DCI component as described with reference to FIGS. 7 through 10.

At 1715, the UE may determine a TRP-specific HARQ-ACK codebook for feedback transmissions to a TRP of the set of TRPs based on the slot allocation. The operations of 1715 may be performed according to the methods described herein. In some examples, aspects of the operations of 1715 may be performed by a HARQ-ACK codebook component as described with reference to FIGS. 7 through 10.

At 1720, the UE may determine one or more TRP-specific uplink parameters for feedback transmissions to the TRP. The operations of 1720 may be performed according to the methods described herein. In some examples, aspects of the operations of 1720 may be performed by an uplink parameter component as described with reference to FIGS. 7 through 10.

At 1725, the UE may transmit feedback to the TRP using a corresponding slot identified by the slot allocation and using the TRP-specific HARQ-ACK codebook and the one or more TRP-specific uplink parameters. The operations of 1725 may be performed according to the methods described herein. In some examples, aspects of the operations of 1725 may be performed by a feedback transmitter as described with reference to FIGS. 7 through 10.

Figure 18:
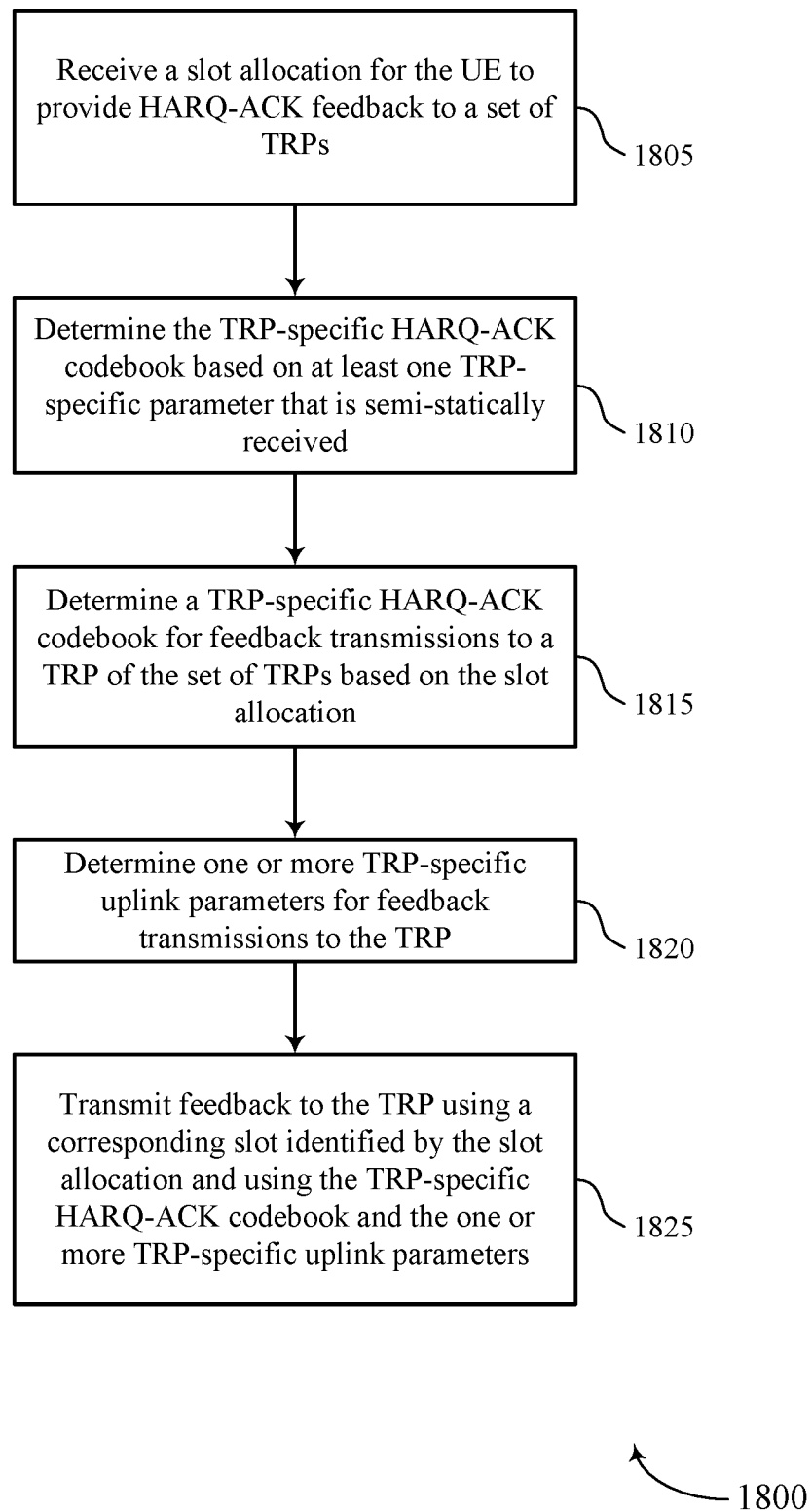

FIG. 18 shows a flowchart illustrating a method 1800 that supports ACK codebook design for multiple TRPs in accordance with aspects of the present disclosure. The operations of method 1800 may be implemented by a UE 115 or its components as described herein. For example, the operations of method 1800 may be performed by a UE codebook manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may receive a slot allocation for the UE to provide HARQ-ACK feedback to a set of TRPs. The operations of 1805 may be performed according to the methods described herein. In some examples, aspects of the operations of 1805 may be performed by a slot allocation receiver as described with reference to FIGS. 7 through 10.

At 1810, the UE may determine the TRP-specific HARQ-ACK codebook based on at least one TRP-specific parameter that is semi-statically received. The operations of 1810 may be performed according to the methods described herein. In some examples, aspects of the operations of 1810 may be performed by a semi-static HARQ-ACK codebook component as described with reference to FIGS. 7 through 10.

At 1815, the UE may determine a TRP-specific HARQ-ACK codebook for feedback transmissions to a TRP of the set of TRPs based on the slot allocation. The operations of 1815 may be performed according to the methods described herein. In some examples, aspects of the operations of 1815 may be performed by a HARQ-ACK codebook component as described with reference to FIGS. 7 through 10.

At 1820, the UE may determine one or more TRP-specific uplink parameters for feedback transmissions to the TRP. The operations of 1820 may be performed according to the methods described herein. In some examples, aspects of the operations of 1820 may be performed by an uplink parameter component as described with reference to FIGS. 7 through 10.

At 1825, the UE may transmit feedback to the TRP using a corresponding slot identified by the slot allocation and using the TRP-specific HARQ-ACK codebook and the one or more TRP-specific uplink parameters. The operations of 1825 may be performed according to the methods described herein. In some examples, aspects of the operations of 1825 may be performed by a feedback transmitter as described with reference to FIGS. 7 through 10.

Figure 19:
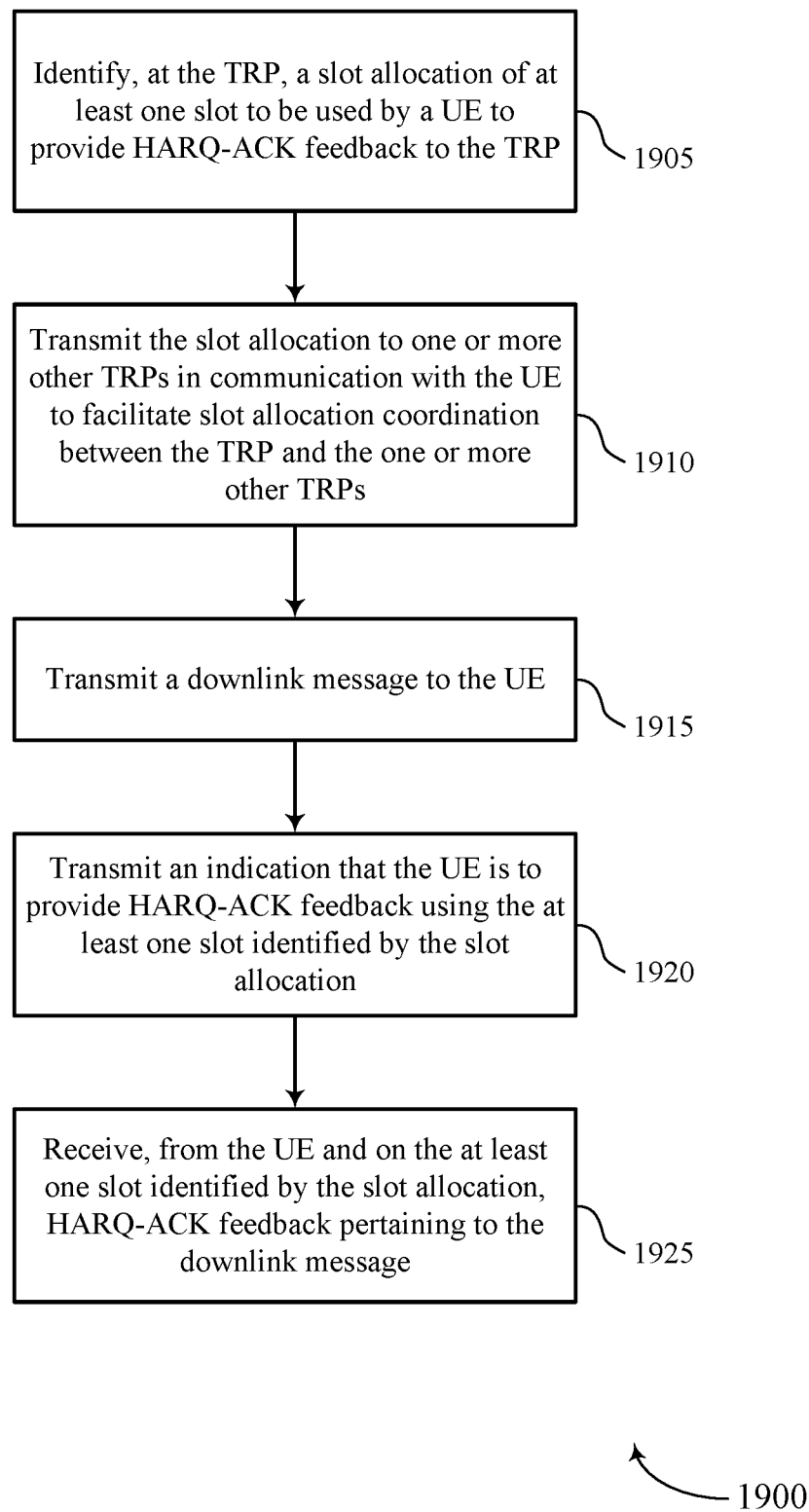

FIG. 19 shows a flowchart illustrating a method 1900 that supports ACK codebook design for multiple TRPs in accordance with aspects of the present disclosure. The operations of method 1900 may be implemented by a base station 105 or its components as described herein. For example, the operations of method 1900 may be performed by a TRP slot allocation manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may identify, at the TRP, a slot allocation of at least one slot to be used by a UE to provide HARQ-ACK feedback to the TRP. The operations of 1905 may be performed according to the methods described herein. In some examples, aspects of the operations of 1905 may be performed by a TRP slot allocation component as described with reference to FIGS. 11 through 14.

At 1910, the base station may transmit the slot allocation to one or more other TRPs in communication with the UE to facilitate slot allocation coordination between the TRP and the one or more other TRPs. The operations of 1910 may be performed according to the methods described herein. In some examples, aspects of the operations of 1910 may be performed by a slot allocation transmitter as described with reference to FIGS. 11 through 14.

At 1915, the base station may transmit a downlink message to the UE. The operations of 1915 may be performed according to the methods described herein. In some examples, aspects of the operations of 1915 may be performed by a downlink message transmitter as described with reference to FIGS. 11 through 14.

At 1920, the base station may transmit an indication that the UE is to provide HARQ-ACK feedback using the at least one slot identified by the slot allocation. The operations of 1920 may be performed according to the methods described herein. In some examples, aspects of the operations of 1920 may be performed by a HARQ-ACK feedback indicator as described with reference to FIGS. 11 through 14.

At 1925, the base station may receive, from the UE and on the at least one slot identified by the slot allocation, HARQ-ACK feedback pertaining to the downlink message. The operations of 1925 may be performed according to the methods described herein. In some examples, aspects of the operations of 1925 may be performed by a feedback receiver as described with reference to FIGS. 11 through 14.

Figure 20:
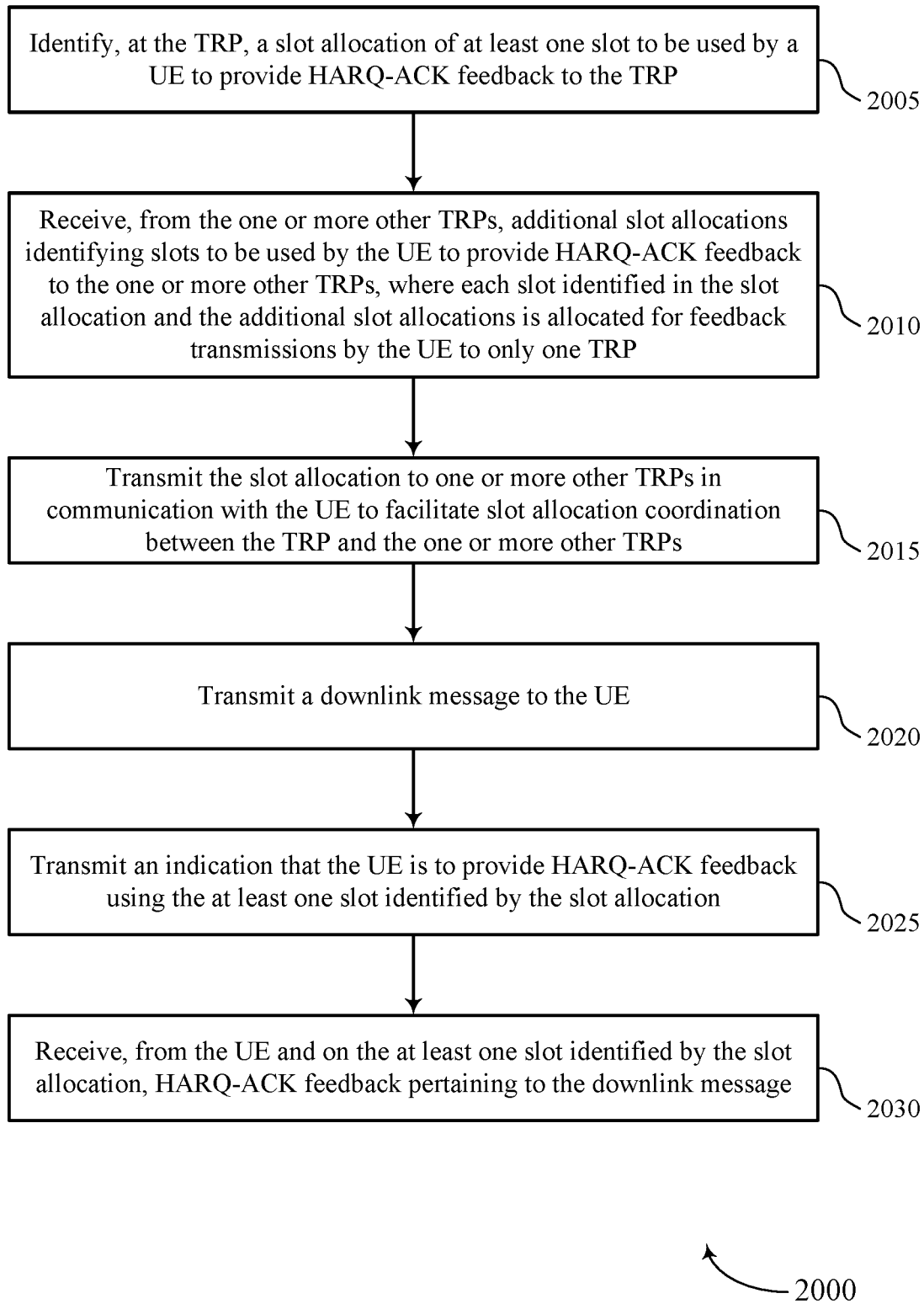

FIG. 20 shows a flowchart illustrating a method 2000 that supports ACK codebook design for multiple TRPs in accordance with aspects of the present disclosure. The operations of method 2000 may be implemented by a base station 105 or its components as described herein. For example, the operations of method 2000 may be performed by a TRP slot allocation manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may identify, at the TRP, a slot allocation of at least one slot to be used by a UE to provide HARQ-ACK feedback to the TRP. The operations of 2005 may be performed according to the methods described herein. In some examples, aspects of the operations of 2005 may be performed by a TRP slot allocation component as described with reference to FIGS. 11 through 14.

At 2010, the base station may receive, from the one or more other TRPs, additional slot allocations identifying slots to be used by the UE to provide HARQ-ACK feedback to the one or more other TRPs, where each slot identified in the slot allocation and the additional slot allocations is allocated for feedback transmissions by the UE to only one TRP. The operations of 2010 may be performed according to the methods described herein. In some examples, aspects of the operations of 2010 may be performed by a TRP slot allocation component as described with reference to FIGS. 11 through 14.

At 2015, the base station may transmit the slot allocation to one or more other TRPs in communication with the UE to facilitate slot allocation coordination between the TRP and the one or more other TRPs. The operations of 2015 may be performed according to the methods described herein. In some examples, aspects of the operations of 2015 may be performed by a slot allocation transmitter as described with reference to FIGS. 11 through 14.

At 2020, the base station may transmit a downlink message to the UE. The operations of 2020 may be performed according to the methods described herein. In some examples, aspects of the operations of 2020 may be performed by a downlink message transmitter as described with reference to FIGS. 11 through 14.

At 2025, the base station may transmit an indication that the UE is to provide HARQ-ACK feedback using the at least one slot identified by the slot allocation. The operations of 2025 may be performed according to the methods described herein. In some examples, aspects of the operations of 2025 may be performed by a HARQ-ACK feedback indicator as described with reference to FIGS. 11 through 14.

At 2030, the base station may receive, from the UE and on the at least one slot identified by the slot allocation, HARQ-ACK feedback pertaining to the downlink message. The operations of 2030 may be performed according to the methods described herein. In some examples, aspects of the operations of 2030 may be performed by a feedback receiver as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, a combined slot allocation for physical uplink control channel (PUCCH) transmissions to different transmission reception points (TRPs) of a plurality of TRPs associated with the network device, wherein the combined slot allocation identifies:
   a first slot that is allocated for PUCCH transmissions to a first TRP of the plurality of TRPs, and
   a second slot that is allocated for PUCCH transmissions to a second TRP of the plurality of TRPs, and
   wherein each slot identified in the combined slot allocation is allocated for PUCCH transmissions by the UE to only one TRP of the plurality of TRPs; and
   transmitting hybrid automatic repeat request (HARQ) acknowledgement feedback to the first TRP using the first slot identified by the combined slot allocation as allotted for PUCCH transmissions to the first TRP and using one or more TRP-specific uplink parameters.

2. The method of claim 1, wherein receiving the combined slot allocation comprises:
   receiving a combined allocation of slots from the network device for PUCCH transmissions to different TRPs of the plurality of TRPs, wherein the slots are allocated asymmetrically between the plurality of TRPs.

3. The method of claim 1, further comprising:
   determining a TRP-specific HARQ acknowledgement codebook based at least in part on at least one TRP-specific parameter that is semi-statically received.

4. The method of claim 3, wherein the at least one TRP-specific parameter is one or more of a number of cells supported by a TRP for carrier aggregation, a cell-specific uplink-downlink configuration associated with a cell of a TRP, a per-bandwidth part table of time-domain resource allocation for physical downlink shared channels for a TRP, a per-bandwidth part set of parameters defining physical downlink shared channel to feedback timing for a TRP, or a per-bandwidth part physical downlink shared channel repetition factor for a TRP.

5. The method of claim 1, further comprising:
   identifying only one physical downlink shared channel reception opportunity per slot per cell from the first TRP for time-domain resource allocations that overlap in time; and
   receiving one physical downlink shared channel transmission from the first TRP associated with the identified physical downlink shared channel reception opportunity, wherein the HARQ acknowledgement feedback transmitted in the first slot includes feedback information pertaining to the one physical downlink shared channel reception opportunity or the one physical downlink shared channel transmission.

6. The method of claim 5, further comprising:
receiving, from the second TRP, an additional physical downlink shared channel transmission, the additional physical downlink shared channel transmission having a time-domain resource allocation in a same component carrier that overlaps with the one physical downlink shared channel transmission received from the first TRP; and
transmitting a second HARQ acknowledgement feedback to the second TRP in the second slot identified by the combined slot allocation as allocated for PUCCH transmission to the second TRP.

7. The method of claim 1, further comprising:
comparing the combined slot allocation with a cell-specific uplink-downlink configuration associated with a cell of the first TRP, wherein the HARQ acknowledgement feedback is transmitted to the first TRP using the first slot only if symbols of the first slot are also allocated for uplink transmissions by the cell-specific uplink-downlink configuration.

8. The method of claim 1, further comprising:
transmitting additional information to the first TRP using the first slot identified by the combined slot allocation.

9. The method of claim 8, wherein the additional information is in a form of a physical uplink shared channel payload, a scheduling request, or a channel state information report, and wherein the HARQ acknowledgement feedback is combined with the additional information on a single uplink channel.

10. The method of claim 1, wherein transmitting the HARQ acknowledgement feedback to the first TRP using the first slot comprises:
transmitting the HARQ acknowledgement feedback via at least one of a physical uplink control channel or as piggybacked uplink control information via a physical uplink shared channel.

11. The method of claim 1, further comprising:
determining the one or more TRP-specific uplink parameters, wherein the one or more TRP-specific uplink parameters are for PUCCH transmissions to the first TRP, and
wherein the determining comprises:
identifying that quasi co-location (QCL) information is configured for physical uplink control channel transmissions; and
identifying TRP-specific QCL information for the first TRP for the first slot.

12. The method of claim 1, further comprising:
determining the one or more TRP-specific uplink parameters, wherein the one or more TRP-specific uplink parameters are for PUCCH transmissions to the first TRP, and
wherein the determining comprises:
identifying TRP-specific power control parameters for transmissions to the first TRP for the first slot.

13. The method of claim 12, wherein the TRP-specific power control parameters comprise at least one of an open-loop power control parameter and a closed-loop power control parameter.

14. The method of claim 1, further comprising:
determining the one or more TRP-specific uplink parameters, wherein the one or more TRP-specific uplink parameters are for PUCCH transmissions to the first TRP, and
wherein the determining comprises:
identifying TRP-specific timing advance parameters for transmissions to the first TRP for the first slot.

15. The method of claim 1, wherein receiving the combined slot allocation comprises:
receiving the combined slot allocation via radio resource control (RRC) signaling.

16. The method of claim 1, further comprising:
determining to transmit a plurality of HARQ acknowledgement feedback messages to the first TRP;
identifying a plurality of slots based at least in part on the combined slot allocation to transmit the plurality of HARQ acknowledgement feedback messages to the first TRP; and
transmitting the plurality of HARQ acknowledgement feedback messages to the first TRP in the identified plurality of slots.

17. The method of claim 16, wherein the plurality of slots comprises slots allocated only to the first TRP, a number of consecutive slots allocated to any of the plurality of TRPs, a number of consecutive slots allocated to the first TRP, or a combination thereof.

18. A method for wireless communication at a first transmission reception point (TRP) of a plurality of TRPs associated with a network device, comprising:
identifying, at the first TRP, a combined slot allocation of at least one slot to be used by a user equipment (UE) for physical uplink control channel (PUCCH) transmissions to different TRPs of the plurality of TRPs, the plurality of TRPs further comprising a second TRP, wherein the combined slot allocation identifies:
a first slot that is allocated for PUCCH transmissions to the first TRP, and
a second slot that is allocated for PUCCH transmissions to the second TRP, and
wherein each slot identified in the combined slot allocation is allocated for PUCCH transmissions by the UE to only one TRP of the plurality of TRPs;
transmitting a downlink message to the UE;
transmitting an indication that the UE is to provide PUCCH transmissions to the different TRPs using the at least one slot identified by the combined slot allocation for each of the different TRPs; and
receiving, from the UE and on the first slot identified by the combined slot allocation as allocated for PUCCH transmissions to the first TRP, hybrid automatic repeat request (HARQ) acknowledgement feedback pertaining to the downlink message.

19. The method of claim 18, further comprising:
transmitting the combined slot allocation to one or more other TRPs in communication with the UE to facilitate slot allocation coordination between the first TRP and the one or more other TRPs;
receiving, from the one or more other TRPs, additional slot allocations identifying slots to be used by the UE for PUCCH transmissions to the one or more other TRPs, wherein each slot identified in the combined slot allocation and the additional slot allocations is allocated for PUCCH transmissions by the UE to only one TRP;
or a combination thereof.

20. The method of claim 18, wherein slots of the combined slot allocation are allocated asymmetrically between the plurality of TRPs.

21. The method of claim 18, wherein transmitting the indication comprises:
transmitting the indication via a downlink control information message.

22. The method of claim 18, further comprising:
transmitting at least one semi-static TRP-specific parameter to the UE.

23. The method of claim 22, wherein the at least one semi-static TRP-specific parameter is one or more of a number of cells supported by the first TRP for carrier aggregation, a cell-specific uplink-downlink configuration associated with a cell of the first TRP, a per-bandwidth part table of time-domain resource allocation for physical downlink shared channels for the first TRP, a per-bandwidth part set of parameters defining physical downlink shared channel to feedback timing for the first TRP, or a per-bandwidth part physical downlink shared channel repetition factor for the first TRP.

24. The method of claim 18, wherein receiving the HARQ acknowledgement feedback pertaining to the downlink message comprises:
receiving the HARQ acknowledgement feedback on the first slot identified by the combined slot allocation only if the first slot is identified as an uplink slot by a cell-specific uplink-downlink configuration associated with the first TRP.

25. The method of claim 18, wherein receiving the HARQ acknowledgement feedback pertaining to the downlink message comprises:
receiving the HARQ acknowledgement feedback on symbols of the first slot identified by the combined slot allocation only if the symbols of the first slot are allocated for uplink transmissions by a cell-specific uplink-downlink configuration associated with the first TRP.

26. The method of claim 18, further comprising:
receiving additional information from the UE using the first slot identified by the combined slot allocation.

27. The method of claim 26, wherein the additional information is in a form of a physical uplink shared channel payload, a scheduling request, or a channel state information report, and wherein the HARQ acknowledgement feedback pertaining to the downlink message is combined with the additional information on a single uplink channel.

28. The method of claim 19, wherein receiving the HARQ acknowledgement feedback pertaining to the downlink message comprises:
receiving the HARQ acknowledgement feedback via at least one of a physical uplink control channel or as piggybacked uplink control information via a physical uplink shared channel.

29. The method of claim 18, further comprising:
transmitting TRP-specific quasi co-location (QCL) information to the UE.

30. The method of claim 18, further comprising:
transmitting TRP-specific power control parameters to the UE for transmissions to the first TRP during the first slot.

31. The method of claim 18, further comprising:
transmitting TRP-specific timing advance parameters to the UE for transmissions to the first TRP during the first slot.

32. The method of claim 18, further comprising:
transmitting the combined slot allocation via radio resource control (RRC) signaling.

33. An apparatus for wireless communication at a user equipment (UE), comprising:
a processor;
memory coupled with the processor; and
instructions stored in the memory and executable by the processor to cause the apparatus to:
receive, from a network device, a combined slot allocation for physical uplink control channel (PUCCH) transmissions to different transmission reception points (TRPs) of a plurality of TRPs associated with the network device, wherein the combined slot allocation identifies:
a first slot that is allocated for PUCCH transmissions to a first TRP of the plurality of TRPs, and
a second slot that is allocated for PUCCH transmissions to a second TRP of the plurality of TRPs, and
wherein each slot identified in the combined slot allocation is allocated for PUCCH transmissions by the UE to only one TRP of the plurality of TRPs; and
transmit hybrid automatic repeat request (HARQ) acknowledgement feedback to the first TRP using the first slot identified by the combined slot allocation as allocated for PUCCH transmissions to the first TRP and using one or more TRP-specific uplink parameters.

34. The apparatus of claim 33, wherein the instructions to receive the combined slot allocation are executable by the processor to cause the apparatus to:
receive a combined allocation of slots for PUCCH transmissions to different TRPs of the plurality of TRPs, wherein the slots are allocated asymmetrically between the plurality of TRPs.

35. The apparatus of claim 33, wherein the instructions are further executable by the processor to cause the apparatus to:
determine a TRP-specific HARQ acknowledgement codebook based at least in part on at least one TRP-specific parameter that is semi-statically received.

36. The apparatus of claim 33, wherein the instructions are further executable by the processor to cause the apparatus to:
identify only one physical downlink shared channel reception opportunity per slot per cell from the first TRP for time-domain resource allocations that overlap in time; and
receive one physical downlink shared channel transmission from the first TRP associated with the identified physical downlink shared channel reception opportunity, wherein the HARQ acknowledgement feedback transmitted in the first slot includes feedback information pertaining to the one physical downlink shared channel reception opportunity or the one physical downlink shared channel transmission.

37. The apparatus of claim 36, wherein the instructions are further executable by the processor to cause the apparatus to:
receive, from the second TRP, an additional physical downlink shared channel transmission, the additional physical downlink shared channel transmission having a time- domain resource allocation in a same component carrier that overlaps with the one physical downlink shared channel transmission received from the first TRP; and
transmit a second HARQ acknowledgement feedback to the second TRP in the second slot identified by the combined slot allocation as allocated for PUCCH transmissions to the second TRP.

38. The apparatus of claim 33, wherein the instructions to transmit the HARQ acknowledgement feedback to the first TRP using the first slot are executable by the processor to cause the apparatus to:

transmit the HARQ acknowledgement feedback via at least one of a physical uplink control channel or as piggybacked uplink control information via a physical uplink shared channel.

39. The apparatus of claim 33, wherein the instructions are further executable by the processor to cause the apparatus to:
determine the one or more TRP-specific uplink parameters, wherein the one or more TRP-specific uplink parameters are for HARQ acknowledgement feedback PUCCH transmissions to the first TRP, and
wherein the instructions to determine the one or more TRP-specific uplink parameters are executable by the processor to cause the apparatus to:
identify TRP-specific power control parameters for transmissions to the first TRP for the first slot.

40. The apparatus of claim 33, wherein the instructions are further executable by the processor to cause the apparatus to:
determine to transmit a plurality of HARQ acknowledgement feedback messages to the first TRP;
identify a plurality of slots based at least in part on the combined slot allocation to transmit the plurality of HARQ acknowledgement feedback messages to the first TRP; and
transmit the plurality of HARQ acknowledgement feedback messages to the first TRP in the identified plurality of slots.

41. An apparatus for wireless communication at a first transmission reception point (TRP) of a plurality of TRPs associated with a network device, comprising:
a processor;
memory coupled with the processor; and
instructions stored in the memory and executable by the processor to cause the apparatus to:
identify, at the first TRP, a combined slot allocation of at least one slot to be used by a user equipment (UE) for physical uplink control channel (PUCCH) transmissions to different TRPs of the plurality of TRPs, the plurality of TRPs further comprising a second TRP, wherein the combined slot allocation identifies:
a first slot that is allocated for PUCCH transmissions to the first TRP, and
a second slot that is allocated for PUCCH transmissions to the second TRP, and
wherein each slot identified in the combined slot allocation is allocated for PUCCH transmissions by the UE to only one TRP of the plurality of TRPs;
transmit a downlink message to the UE;
transmit an indication that the UE is to provide PUCCH transmissions to the different TRPs using the at least one slot identified by the combined slot allocation for each of the different TRPs; and
receive, from the UE and on the first slot identified by the combined slot allocation as allocated for PUCCH transmissions to the first TRP, hybrid automatic repeat request (HARQ) acknowledgement feedback pertaining to the downlink message.

42. The apparatus of claim 41, wherein the instructions are further executable by the processor to cause the apparatus to:
transmit the combined slot allocation to one or more other TRPs in communication with the UE to facilitate slot allocation coordination between the first TRP and the one or more other TRPs; and
receive, from the one or more other TRPs, additional slot allocations identifying slots to be used by the UE for PUCCH transmissions to the one or more other TRPs, wherein each slot identified in the combined slot allocation and the additional slot allocations is allocated for PUCCH transmissions by the UE to only one TRP.

43. The apparatus of claim 41, wherein slots of the combined slot allocation are allocated asymmetrically between the plurality of TRPs.

44. The apparatus of claim 41, wherein the instructions to transmit the indication are executable by the processor to cause the apparatus to:
transmit the indication via a downlink control information message.

45. An apparatus for wireless communication at a user equipment (UE), comprising:
means for receiving, from a network device, a combined slot allocation for physical uplink control channel (PUCCH) transmissions to different transmission reception points (TRPs) of a plurality of TRPs associated with the network device, wherein the combined slot allocation identifies:
a first slot that is allocated for PUCCH transmissions to a first TRP of the plurality of TRPs, and
a second slot that is allocated for PUCCH transmissions to a second TRP of the plurality of TRPs, and
wherein each slot identified in the combined slot allocation is allocated for PUCCH transmissions by the UE to only one TRP of the plurality of TRPs; and
means for transmitting hybrid automatic repeat request (HARQ) acknowledgement feedback to the first TRP using the first slot identified by the combined slot allocation as allocated for PUCCH transmissions to the first TRP and using one or more TRP- specific uplink parameters.

46. An apparatus for wireless communication at a first transmission reception point (TRP) of a plurality of TRPs associated with a network device, comprising:
means for identifying, at the first TRP, a combined slot allocation of at least one slot to be used by a user equipment (UE) for physical uplink control channel (PUCCH) transmissions to different TRPs of the plurality of TRPs, the plurality of TRPs further comprising a second TRP, wherein the slot combined allocation identifies:
a first slot that is allocated for PUCCH transmissions to the first TRP, and
a second slot that is allocated for PUCCH transmissions to the second TRP, and
wherein each slot identified in the combined slot allocation is allocated for PUCCH transmissions by the UE to only one TRP of the plurality of TRPs;
means for transmitting the combined slot allocation to one or more other TRPs in communication with the UE to facilitate slot allocation coordination between the first TRP and the one or more other TRPs;
means for transmitting a downlink message to the UE;
means for transmitting an indication that the UE is to provide PUCCH transmissions to the different TRPs using the at least one slot identified by the combined slot allocation for each of the different TRPs; and
means for receiving, from the UE and on the first slot identified by the combined slot allocation as allocated for PUCCH transmissions to the first TRP, hybrid automatic repeat request (HARQ) acknowledgement feedback pertaining to the downlink message.

47. A non-transitory, computer-readable medium storing code for wireless communication at a user equipment (UE), the code comprising instructions executable by a processor to:
    receive, from a network device, a combined slot allocation for physical uplink control channel (PUCCH) transmissions to different transmission reception points (TRPs) of a plurality of TRPs associated with a network device, wherein the combined slot allocation identifies:
        a first slot that is allocated for PUCCH transmissions to a first TRP of the plurality of TRPs, and
        a second slot that is allocated for PUCCH transmissions to a second TRP of the plurality of TRPs, and
    wherein each slot identified in the combined slot allocation is allocated for PUCCH transmissions by the UE to only one TRP of the plurality of TRPs; and
    transmit hybrid automatic repeat request (HARQ) acknowledgement feedback to the first TRP using the first slot identified by the combined slot allocation as allocated for PUCCH transmissions to the first TRP and using one or more TRP-specific uplink parameters.

48. A non-transitory, computer-readable medium storing code for wireless communication at a first transmission reception point (TRP) of a plurality of TRPs associated with a network device, the code comprising instructions executable by a processor to:
    identify, at the first TRP, a combined slot allocation of at least one slot to be used by a user equipment (UE) for physical uplink control channel (PUCCH) transmissions to different TRPs of the plurality of TRPs, the plurality of TRPs further comprising a second TRP, wherein the combined slot allocation identifies:
        a first slot that is allocated for PUCCH transmissions to the first TRP, and
        a second slot that is allocated for PUCCH transmissions to the second TRP, and
    wherein each slot identified in the combined slot allocation is allocated for PUCCH transmissions by the UE to only one TRP of the plurality of TRPs;
    transmit the combined slot allocation to one or more other TRPs in communication with the UE to facilitate slot allocation coordination between the first TRP and the one or more other TRPs;
    transmit a downlink message to the UE;
    transmit an indication that the UE is to provide PUCCH transmissions to the different TRPs using the at least one slot identified by the combined slot allocation for each of the different TRPs; and
    receive, from the UE and on the first slot identified by the combined slot allocation as allocated for PUCCH transmissions to the first TRP, hybrid automatic repeat request (HARQ) acknowledgement feedback pertaining to the downlink message.

\* \* \* \* \*